United States Patent [19]

Danno et al.

[11] Patent Number: 5,151,861
[45] Date of Patent: Sep. 29, 1992

[54] VEHICLE ENGINE OUTPUT CONTROL METHOD AND VEHICLE ENGINE

[75] Inventors: Yoshiaki Danno, Kyoto; Kazuhide Togai, Takatsuki; Masato Yoshida, Kyoto; Katsunori Ueda, Kyoto; Makoto Shimada, Kyoto, all of Japan

[73] Assignee: Mitsubishi Jidosha Kogyo Kabushiki Kaisha, Tokyo, Japan

[21] Appl. No.: 840,646

[22] Filed: Feb. 21, 1992

Related U.S. Application Data

[63] Continuation-in-part of Ser. No. 482,169, Feb. 20, 1990, abandoned.

[30] Foreign Application Priority Data

Feb. 22, 1989 [JP] Japan .................................. 1-42421
Feb. 22, 1989 [JP] Japan .................................. 1-42422

[51] Int. Cl.⁵ ...................... F02D 41/04; G06F 15/50
[52] U.S. Cl. .............................. 364/426.02; 180/197; 123/336; 364/431.04
[58] Field of Search .................... 364/426.01, 426.02, 364/426.03, 431.04, 431.07, 426.04; 180/197; 123/336, 361, 399, 442; 74/844, 866; 192/0.062, 0.08

[56] References Cited

U.S. PATENT DOCUMENTS

| 4,637,487 | 1/1987 | Nakamura et al. | 180/197 |
|---|---|---|---|
| 4,722,411 | 2/1988 | Ohashi et al. | 180/197 |
| 4,744,031 | 5/1988 | Takeda et al. | 364/424.1 |
| 4,763,264 | 8/1988 | Okuno et al. | 364/431.01 |
| 4,811,808 | 3/1989 | Matsumoto et al. | 180/197 |
| 4,893,526 | 1/1990 | Tokoro | 74/866 |
| 4,911,259 | 5/1990 | Dogahara et al. | 180/170 |
| 4,933,857 | 6/1990 | Hashiguchi et al. | 364/426.02 |

Primary Examiner—Parshotam S. Lall
Assistant Examiner—Collin W. Park
Attorney, Agent, or Firm—Abelman Frayne & Schwab

[57] ABSTRACT

A method and apparatus for calculating a target torque of an engine in accordance with operation condition of a vehicle, calculating a target intake air amount per engine revolution cycle required to generate the target engine torque, calculating an opening of a sub throttle valve disposed in an intake path of the engine from an opening of a main throttle valve disposed in the intake path, of which an opening is controlled in accordance with an operation amount of an accelerator pedal, and the target intake air amount, or calculating an equivalent throttle opening assuming the main throttle valve and the sub throttle valve as an equivalent throttle valve in accordance with the target intake air amount, calculating the sub throttle valve opening by correcting the equivalent throttle opening with a correction coefficient determined by the relationship between the equivalent throttle opening and the main throttle valve opening, and on/off controlling the sub throttle valve in accordance with the calculated sub throttle valve opening.

8 Claims, 28 Drawing Sheets

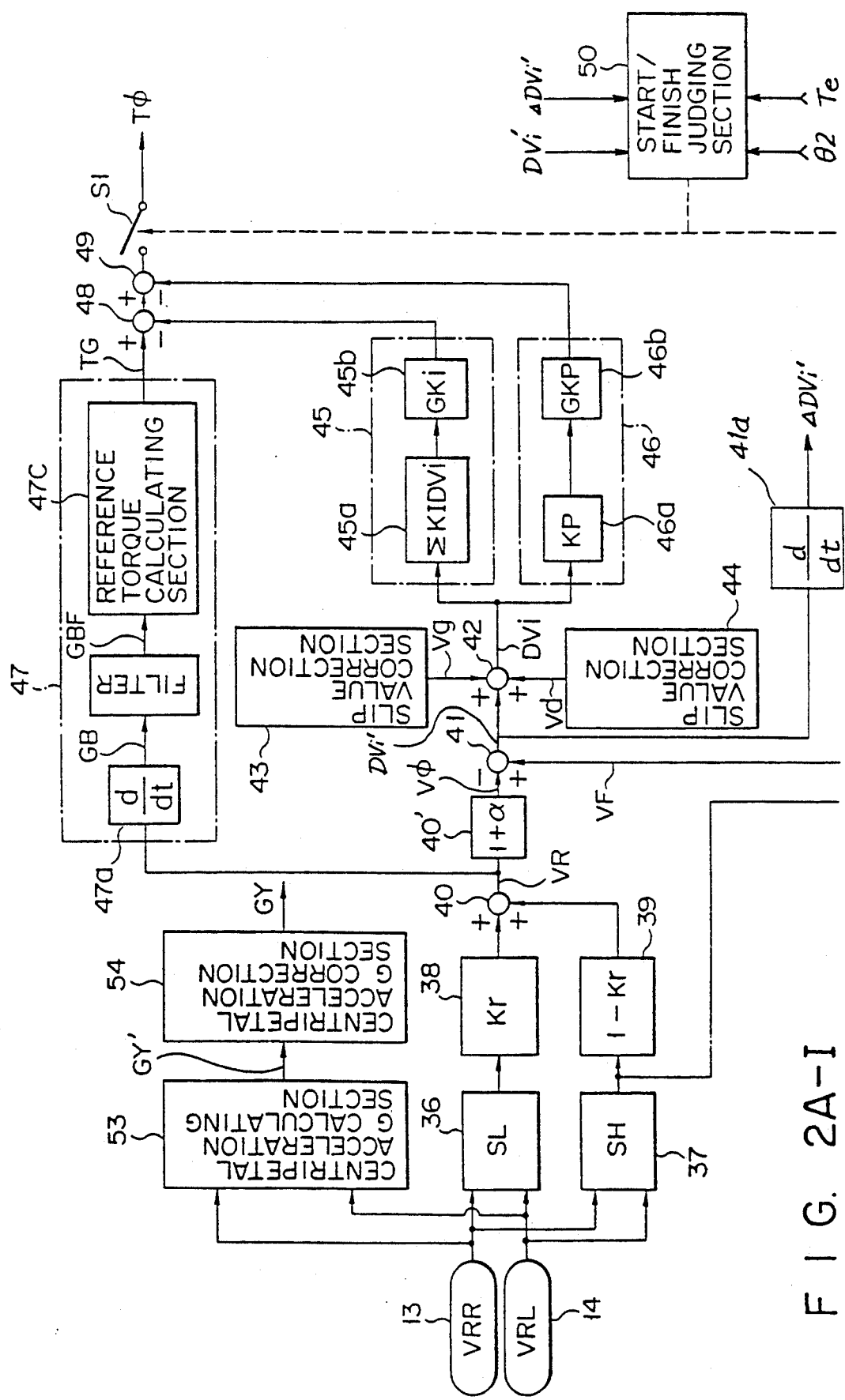
FIG. 2A-I

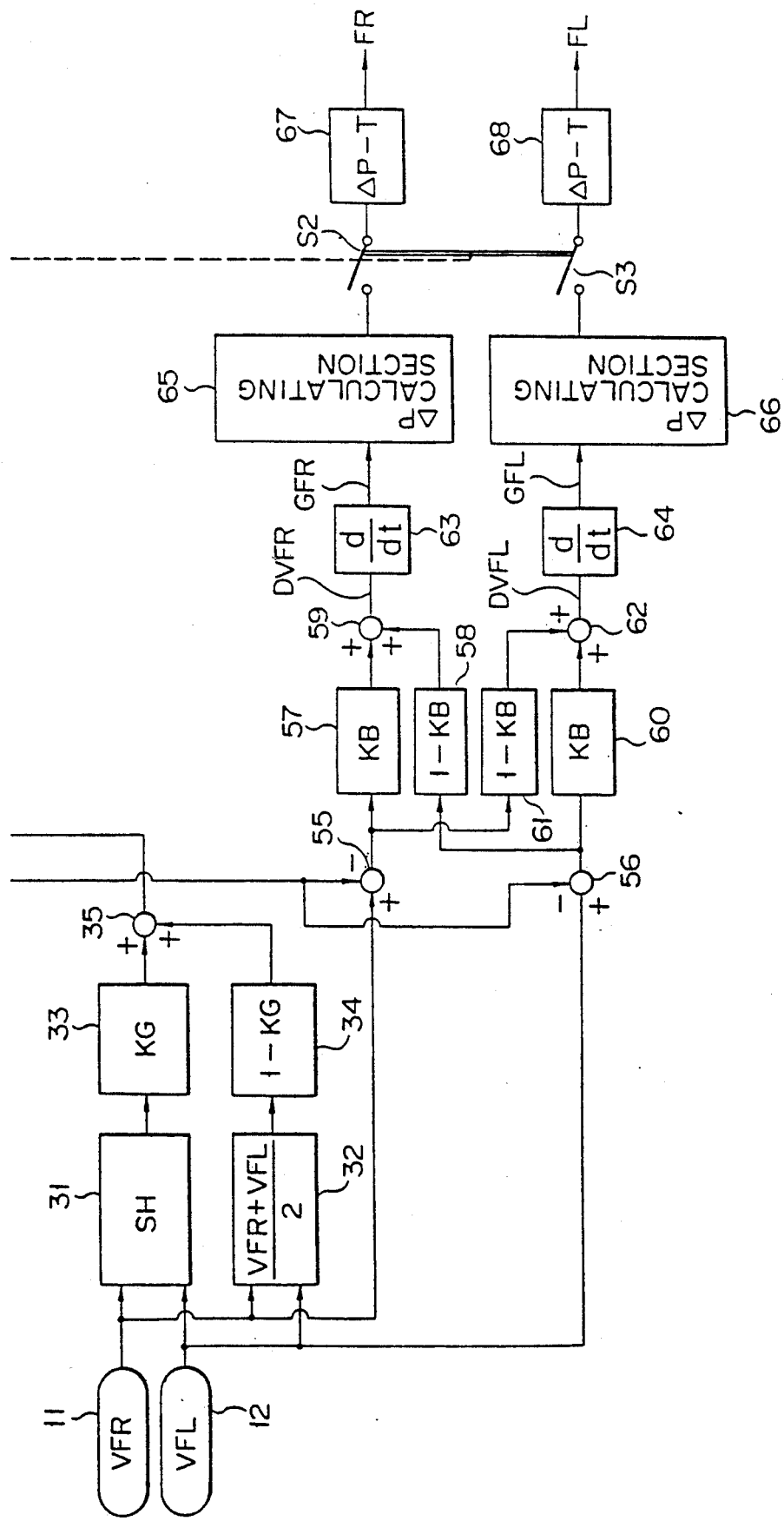
FIG. 2A-II

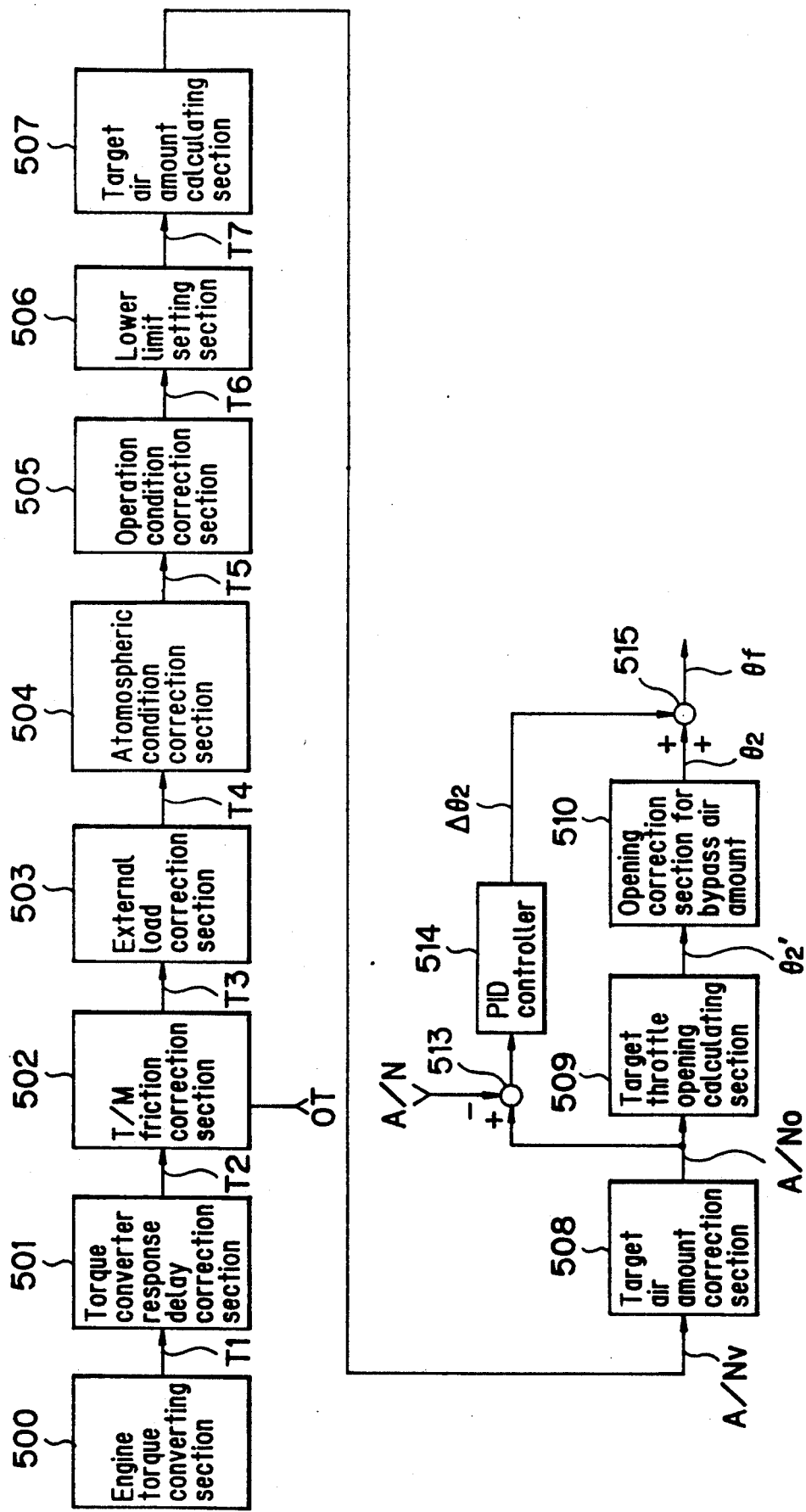

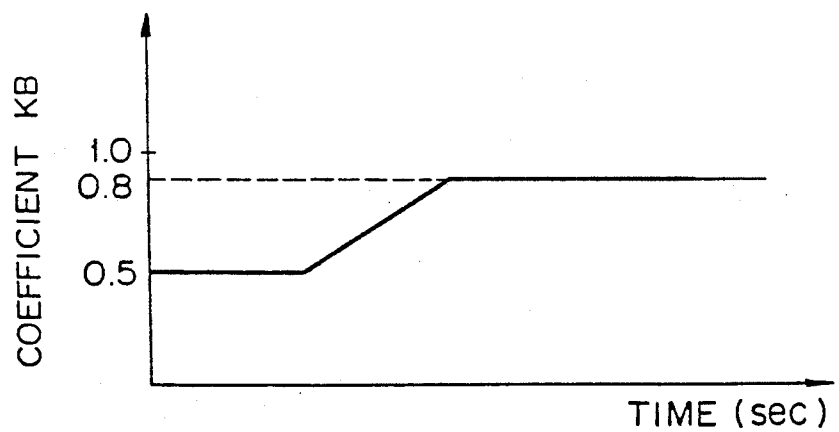
F I G. 13
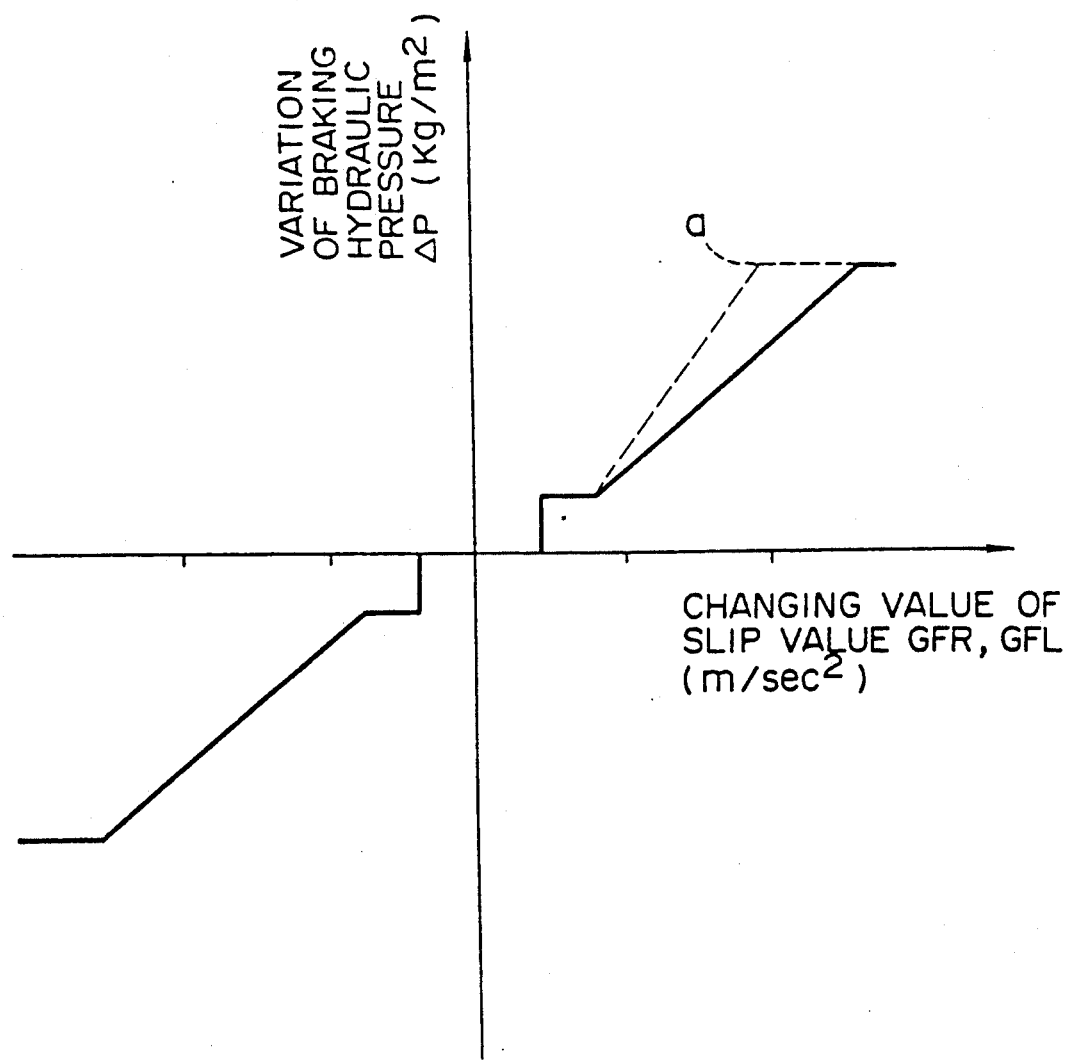
F I G. 14

F I G. 15
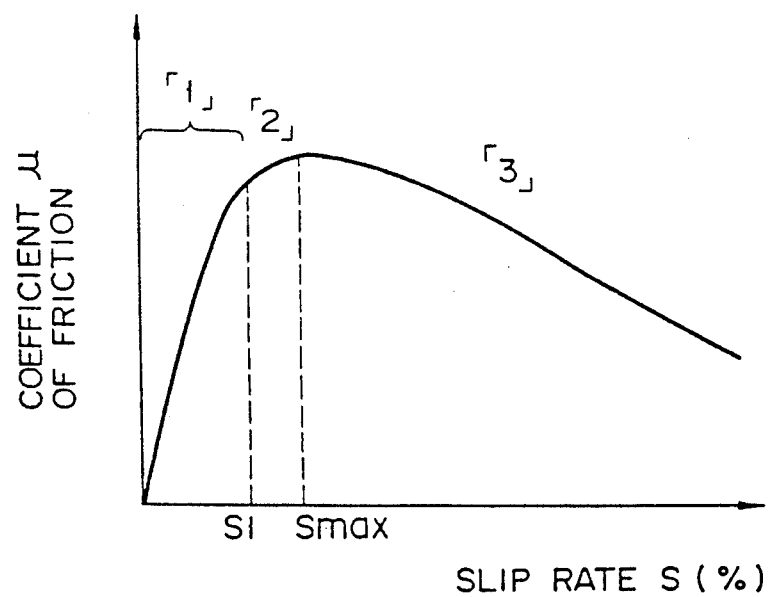
F I G. 16
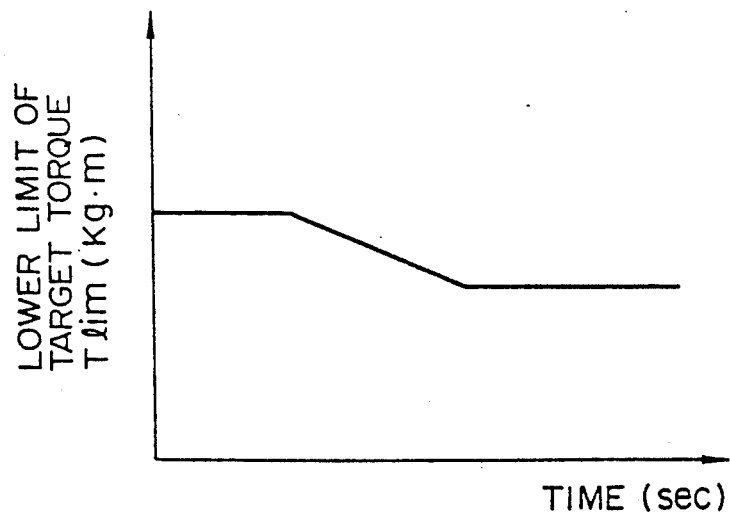
F I G. 17
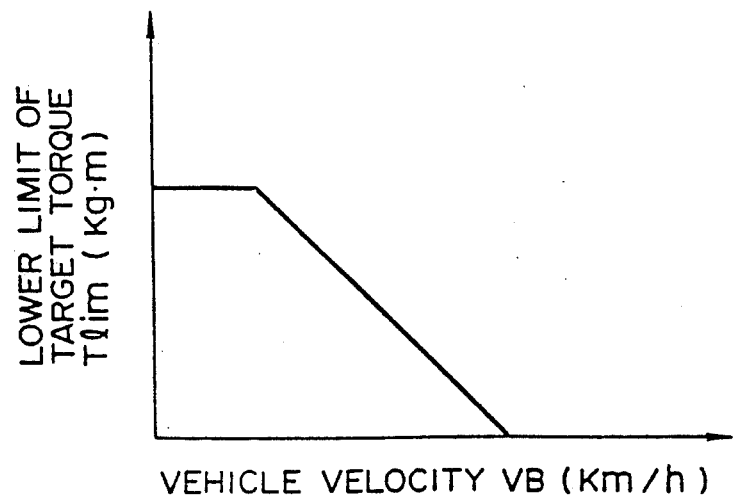

|   | CUMULATIVE INTAKE AIR AMOUNT | | $\Sigma Qa$ |
|---|---|---|---|
| COOLING WATER TEMPERATURE WT | | Tf | |
| | | | |
| | | | |

FIG. 24

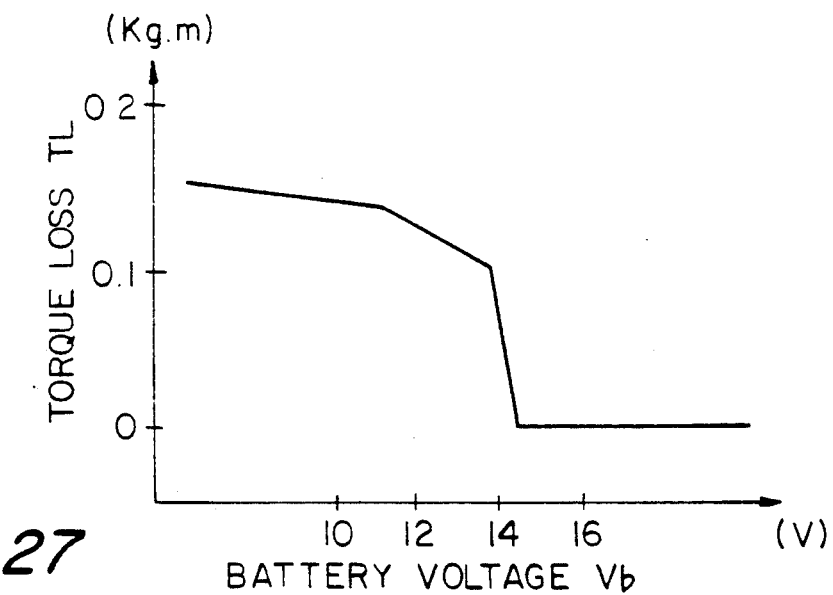
FIG. 27
FIG. 28
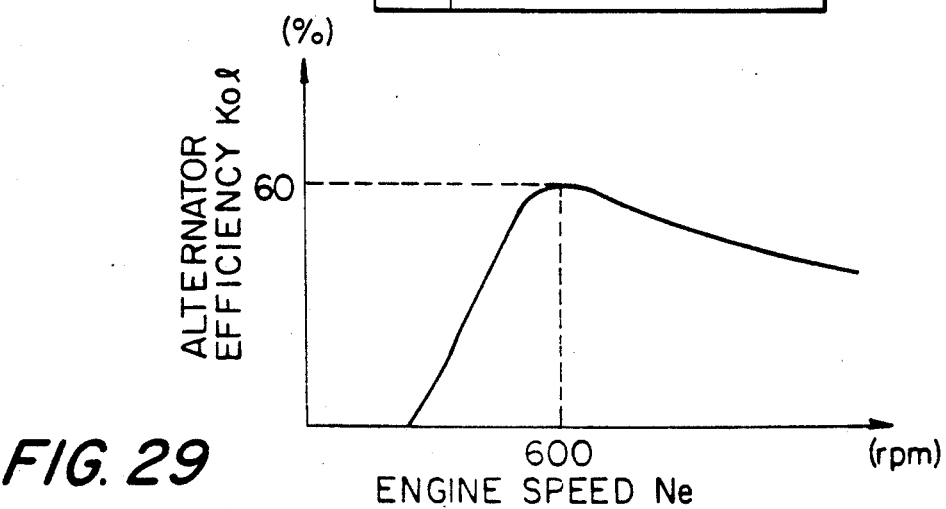
FIG. 29

| | 20 | 40 | | 100% |
|---|---|---|---|---|
| 0 | 10 | 10 | ----- | 10 |
| 20 | 22 | 20 | ----- | 16 |
| | | | | |
| 255 | 100 | 100 | ----- | 100 |

| | MAIN THROTTLE OPENING θ₁ | | |
|---|---|---|---|
| A/N₀ | θ₂' | | |
| TARGET AIR AMOUNT | | | |

| $\theta_1/\theta_h$ | 0.5 $\beta_1$ | 0.6 $\beta_2$ | ---- | 1.0 |
|---|---|---|---|---|
| CORRECTION COEFFICIENT K | 1.0 $K_1$ | 0.99 $K_2$ | ---- | 0.9 |

VEHICLE ENGINE OUTPUT CONTROL METHOD AND VEHICLE ENGINE

This application is a continuation-in-part of U.S. patent application Ser. No. 482,169, filed Feb. 20 th, 1990, now abandoned.

BACKGROUND OF THE INVENTION

1. Field of the Invention

The present invention relates to a vehicle engine output control method and a vehicle engine output control apparatus adopted when an engine output of a vehicle is controlled to a target engine output.

2. Description of the Related Art

A traction control apparatus is well known as one of control apparatus which control an engine output of a vehicle to a predetermined target torque. In the traction control apparatus, when an acceleration slip of the driving wheels is detected, a slip rate S is controlled to cause a coefficient $\mu$ of friction between the wheels and a road surface to fall within a maximum range (a hatched range in FIG. 18). The slip rate S is given by $(VF-VB/VF) \cdot 100$ (%), where VF is the wheel velocity of driving wheels, and VB is the vehicle velocity. More specifically, when a slip of driving wheels is detected, an engine output is controlled to cause the slip rate S to fall within the hatched range, thereby controlling the coefficient $\mu$ of friction between wheels and a road surface to fall within the maximum range. Thus, an acceleration slip of driving wheels is prevented to improve acceleration characteristics of a vehicle.

To detect a slip of driving wheels is detected in such a traction control apparatus, it is necessary to control the engine output to a target engine output at which no slip occurs. For example, in a traction control apparatus having a main throttle valve controlled by an accelerator pedal and an electrically controlled sub throttle valve, provided in an intake path of an engine, an opening of the sub throttle valve must be controlled taking account of an opening of the main throttle valve to obtain a target engine output.

SUMMARY OF THE INVENTION

It is an object of the present invention to provide a vehicle engine output control method and apparatus having a main throttle valve controlled by an accelerator pedal and an electrically controlled sub throttle valve provided in an intake path of an engine, which can accurately control an opening of the sub throttle valve so that the engine output is a target engine torque.

In accordance with the present invention, there is provided a vehicle engine control method comprising calculating a target torque of an engine in accordance with operation condition of a vehicle, calculating a target intake air amount per engine revolution cycle necessary to output the target engine torque, calculating an opening of a sub throttle valve disposed in an intake path of the engine from an opening of a main throttle valve disposed in the intake path of which the opening is controlled in accordance with an operation amount of an accelerator pedal and the target intake air amount to on/off control the sub throttle valve in accordance with the calculated sub throttle valve opening, calculating an equivalent throttle opening assuming the main throttle valve and the sub throttle valve as an equivalent throttle valve based on the target intake air amount, correcting the equivalent throttle opening with a correction coefficient determined by the equivalent throttle opening and the main throttle valve opening to calculate an opening of the sub throttle valve, and on/off controlling the sub throttle valve in accordance with the calculated opening of the sub throttle valve.

There is also provided according to the present invention a vehicle engine output control apparatus comprising a main throttle valve of which an opening is controlled in accordance with an operation amount of an accelerator pedal, disposed in an intake path of an engine for a vehicle, a sub throttle valve disposed in the intake path, operation condition detecting means for detecting operation condition of the vehicle, target engine torque calculating means for calculating an engine torque to be outputted from the engine in accordance with the detection result of the operation condition detecting means, target intake air amount calculating means for calculating a target intake air amount per engine revolution cycle required to generate the target engine torque, sub throttle valve opening calculating means for calculating an opening of the sub throttle valve from the target intake air amount and an opening of the main throttle valve, and sub throttle valve on/off control means for on/off controlling the sub throttle valve in accordance with the calculated sub throttle valve opening; or in substitution for the sub throttle valve opening calculating means, further comprising equivalent throttle valve opening calculating means for calculating an equivalent throttle opening from a target intake air amount per engine revolution cycle assuming the main and sub throttle valves as an equivalent throttle valve, correction coefficient storing means for storing a correction coefficient determined by the relationship between the equivalent throttle opening and the main throttle valve opening, and sub throttle valve opening calculating means for calculating the opening of the sub throttle valve by correcting the equivalent throttle opening with the correction coefficient.

With the present invention, since the target engine output is converted into the target air amount and the opening of the sub throttle valve is definitely determined in accordance with the opening of the main throttle valve and the target air amount, the opening of the sub throttle valve can be immediately determined even when the opening of the main throttle valve is varied, thereby achieving accurate engine control.

Furthermore, with the vehicle the present invention, the equivalent throttle opening assuming the main throttle valve and the sub throttle valve as an equivalent throttle valve is determined from the target air amount, and the equivalent throttle opening is corrected to definitely obtain the opening of the sub throttle valve, which is used to on/off control the sub throttle valve, thereby achieving accurate engine control.

BRIEF DESCRIPTION OF THE DRAWINGS

FIGS. 2A-I, 2A-II, 2B, and 2C are block diagrams showing control functions of a traction controller shown in FIG. 1 in units of functional blocks;

FIG. 13 is a graph showing a change in variable KB as a function of an elapse time from the beginning of brake control;

FIG. 14 is a graph showing the relationship between a changing value GFR (GFL) of the slip value and a variation $\Delta P$ of a braking hydraulic pressure;

FIGS. 15 and 18 are graphs showing the relationship between a slip rate S and a coefficient $\mu$ of friction of a road surface;

FIG. 16 is a graph showing Tlim-t characteristics;

FIG. 17 is a graph showing Tlim-VB characteristics;

FIG. 24 is a three-dimensional map showing relationship between engine cooling water temperature WT-cumulative intake air amount $\Sigma Q$ and a torque correction value Tf;

FIG. 27 is a graph showing relationship between a battery voltage Vb and a torque loss TL;

FIG. 28 is a three-dimensional map showing an engine speed Ne and an alternator excitation current $i\phi$ versus a torque loss TL;

FIG. 29 is a graph showing an excitation current $i\phi$ versus an alternator efficiency K;

DETAILED DESCRIPTION OF THE PREFERRED EMBODIMENTS

Figure 1A:
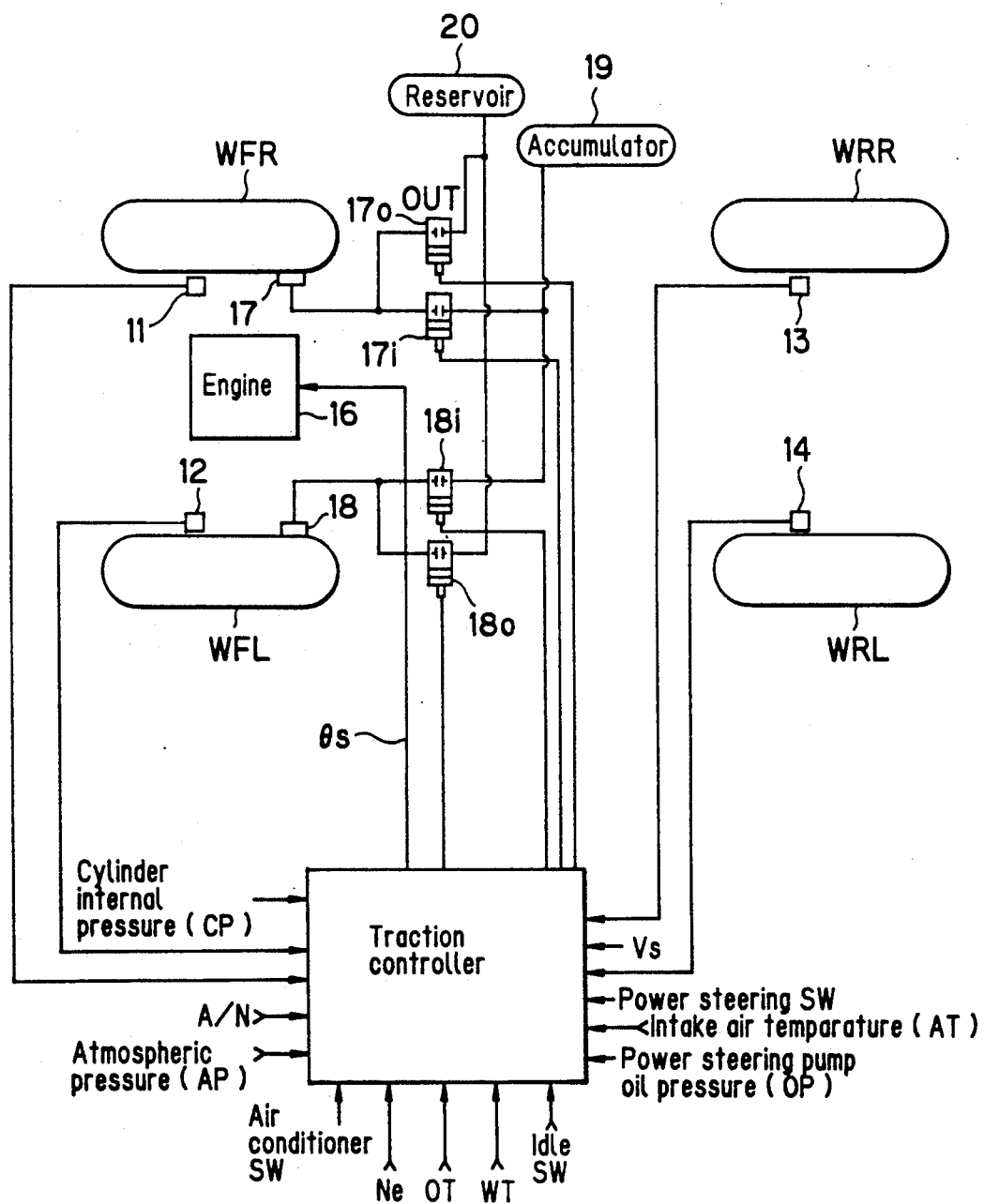
FIG. 1A is a block diagram showing the overall arrangement of a traction control apparatus to which the control method and apparatus according to the present invention is applied.
Figure 1B:
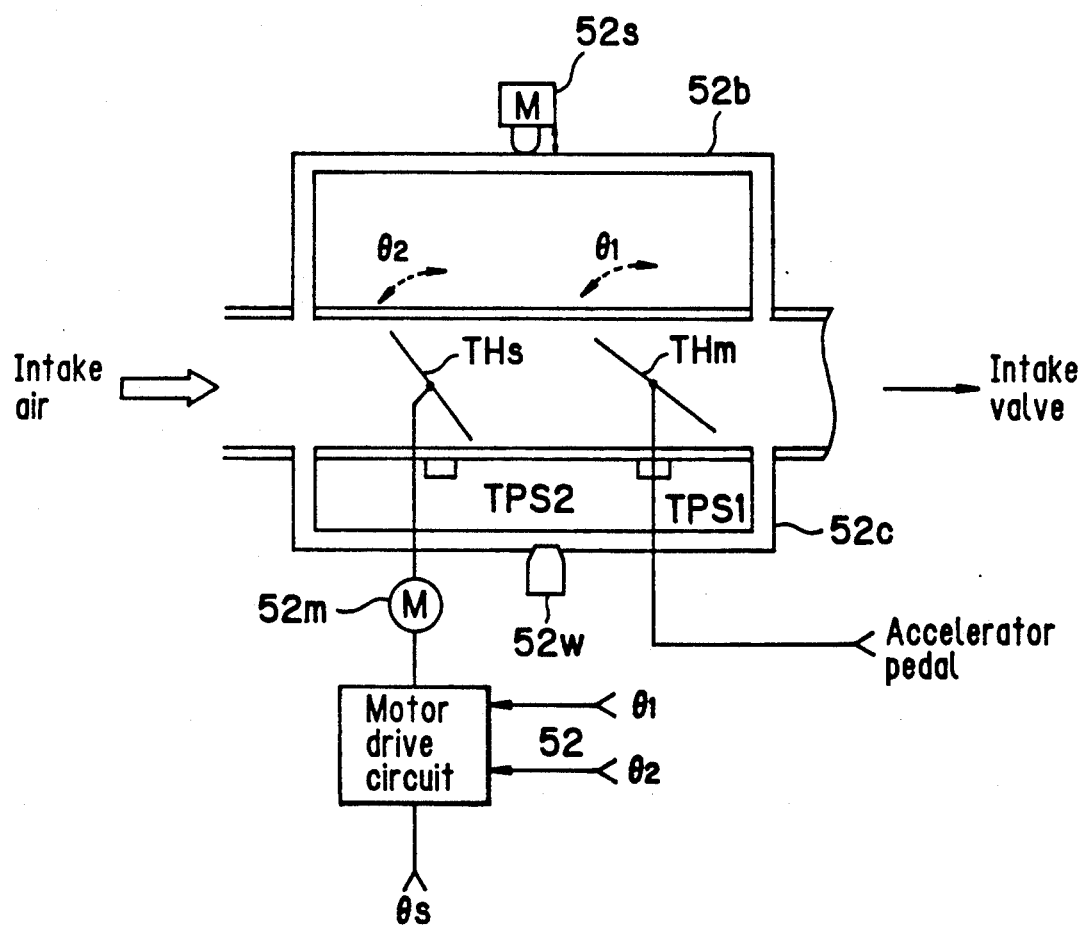
FIG. 1B is a diagram showing arrangements of main and sub throttle valves.

A traction control apparatus for a vehicle to which a vehicle engine output control apparatus according to an embodiment of the present invention is applied will now be described with reference to the accompanying drawings. FIG. 1(A) is a block diagram showing a traction control apparatus for a vehicle. FIG. 1(A) exemplifies a front-drive vehicle, and reference symbol WFR denotes a front right wheel; WFL, a front left wheel; WRR, a rear right wheel; and WRL, a rear left wheel. Reference numeral 11 denotes a wheel velocity sensor for detecting a wheel velocity VFR of the front right wheel (driving wheel) WFR; 12, a wheel velocity sensor for detecting a wheel velocity VFL of the front left wheel (driving wheel) WFL; 13, a wheel velocity sensor for detecting a wheel velocity VRR of the rear right wheel (driven wheel) WRR; and 14, a wheel velocity sensor for detecting a wheel velocity VRL of the rear left wheel (driven wheel) WRL. The wheel velocities VFR, VFL, VRR, and VRL detected by the wheel velocity sensors 11 to 14 are inputted to a traction controller 15. The traction controller 15 receives an intake air temperature AT detected by an intake air temperature sensor (not shown), an atmospheric pressure AP detected by an atmospheric pressure sensor (not shown), an engine speed Ne detected by an engine speed sensor (not shown), an intake air amount A/N per engine revolution cycle detected by an air flow sensor (not shown), a transmission oil temperature OT detected by an oil temperature sensor (not shown), an engine cooling water temperature WT detected by a water temperature sensor (not shown), operation condition of an air conditioner switch (not shown), operation condition of a power steering switch SW (not shown), operation condition of an idle switch (not shown), an oil temperature OT of a power steering pump (not shown), an internal pressure CP of an engine cylinder detected by a cylinder internal pressure sensor (not shown), an engine combustion chamber wall temperature CT detected by a combustion chamber wall temperature sensor (not shown), and an elapse time $\tau$ from the beginning of engine operation outputted from a timer (now shown). The traction controller 15 sends a control signal to an engine 16 to control the engine to prevent a slip of the driving wheels in an acceleration state. As shown in FIG. 1(B), the engine 16 has a main throttle valve THm whose opening $\theta 1$ is operated by an accelerator pedal, and a sub throttle valve THs whose opening $\theta 2$ is controlled by an opening signal $\theta s$ (to be described later) from the traction controller 15. The opening $\theta 2$ of the sub throttle valve THs is changed by controlling a rotation of the motor 52m by a motor drive circuit 52 in accordance with the opening signal $\theta s$ from the traction controller 15. When the opening $\theta 2$ of the sub throttle valve THs is controlled in this manner, the driving force of the engine 16 is controlled. Note that the openings $\theta 1$ and $\theta 2$ of the main and sub throttle, valves THm and THs are respectively detected by throttle position sensors TPS1 and TPS2 and outputted to the motor drive circuit 52. A bypass path 52b for assuring an intake air amount in an idling state is arranged between the upstream and downstream sides of the main and sub throttle valves THm and THs. The opening of the bypass path 52b is controlled by a stepper motor 52s. Furthermore, a bypass path 52c is arranged between the upstream and downstream sides of the main and sub throttle valves THm and THs, and in the bypass path 52c is provided a wax valve 52W whose opening is controlled according to the cooling water temperature WT of the engine 16.

In FIG. 1(A), reference numeral 17 denotes a wheel cylinder for braking the front right wheel WFR; and 18, a wheel cylinder for braking the front left wheel WFL. A pressurized oil is supplied to these wheel cylinders upon operation of a brake pedal (not shown). During a traction control operation, a pressurized oil can be supplied via another path to be described below. A pressurized oil is supplied from an accumulator 19 to the wheel cylinder 17 through an inlet valve 17i, and is exhausted from the wheel cylinder 17 to a reservoir 20 through an outlet valve 17o. A pressurized oil is supplied from the accumulator 19 to the wheel cylinder 18 through an inlet valve 18i, and is exhausted from the wheel cylinder 18 to the reservoir 20 through an outlet valve 18o. The inlet valves 17i and 18i and the outlet valves 17o and 18o are opening/closing-controlled by the traction controller 15.

Figure 2C:
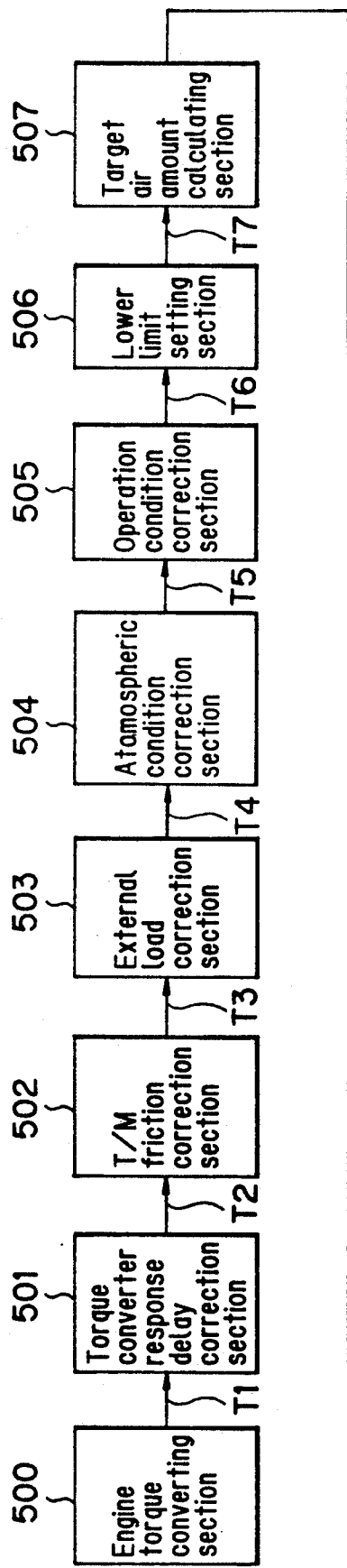
Figure 2C:
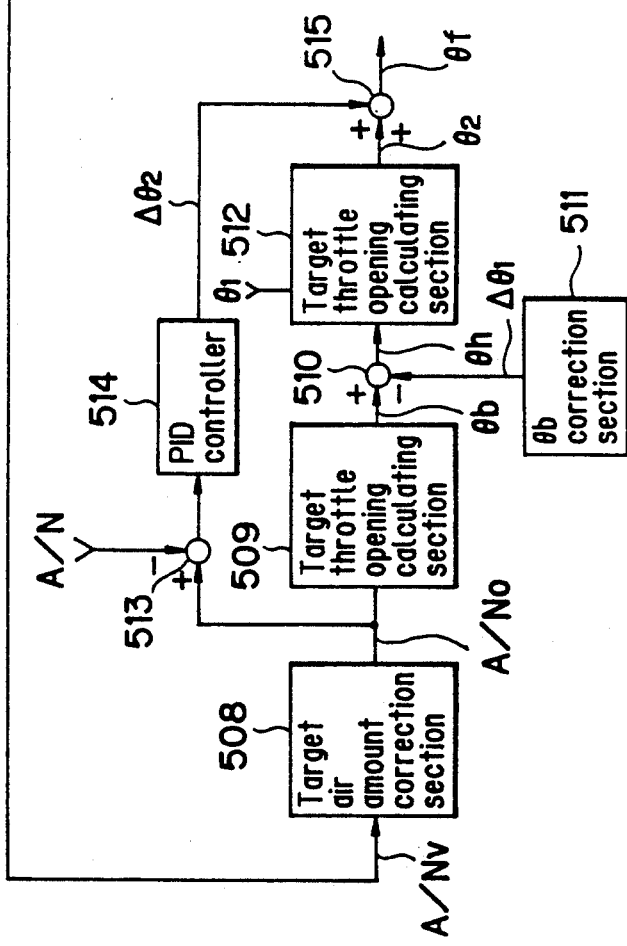

The detailed arrangement of the traction controller will be described below with reference to FIG. 2. In this Figure, reference numerals 11 and 12 denote wheel velocity sensors to detect wheel velocities VFR and VFL of the driving wheels WFR and WFL. The wheel velocities VFR and VFL of the driving wheels detected by the wheel velocity sensors 11 and 12 are supplied to a high-velocity selector 31 and an averaging section 32. The high-velocity selector 31 is to select a higher one of the wheel velocities VFR and VFL. A driving wheel velocity selected by the high-velocity selector 31 is outputted to a weighting section 33. The averaging section 32 is to calculate an average wheel velocity (VFR+VFL)/2 from the wheel velocities VFR and VFL of the driving wheels detected by the wheel speed sensors 11 and 12. The average driving wheel velocity calculated by the averaging section 32 is outputted to a weighting section 34. In the weighting section 33, a higher one of the driving wheel velocities WFR and WFL selected and outputted from the high-velocity selector 31 is multiplied with a variable KG. The average wheel velocity outputted from the averaging section 32 is multiplied with a variable $(1-KG)$ in the weighting section 34. The driving wheel velocity and the average driving wheel velocity weighted by weighting sections 33 and 34 are sent to an adder 35 to be added to each other, thus obtaining a driving wheel velocity VF.

Figure 3:
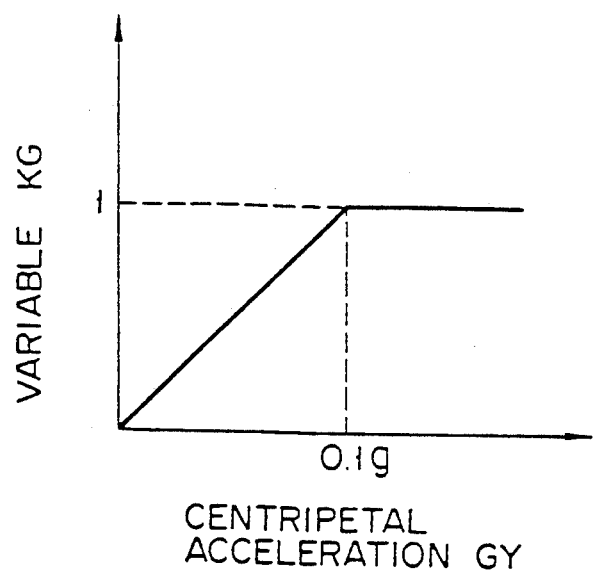
FIG. 3 is a graph showing the relationship between a centripetal acceleration GY and a variable KG.

Note that the variable KG changes as a function of a centripetal acceleration GY, as shown in FIG. 3. The variable KG is proportional to the centripetal acceleration GY up to a predetermined value of the centripetal acceleration (e.g., 0.1 g), and becomes "1" when the centripetal acceleration exceeds the predetermined value.

The wheel velocities VRR and VRL of the driven wheels detected by the wheel velocity sensors 13 and 14 are inputted to a low-velocity selector 36 and a high-velocity selector 37. The low-velocity selector 36 selects a lower one of the driven wheel velocities VRR and VRL, and the high-velocity selector 37 selects a higher one of the driven wheel velocities VRR and VRL. The lower driven wheel velocity selected by the low-velocity selector 36 is outputted to a weighting section 38, and the higher driven wheel velocity selected by the high-velocity selector 37 is outputted to a weighting section 39. The lower one of the velocities of the driven wheels WRR and WRL selected by the low-velocity selector 36 is multiplied with a variable Kr in the weighting section 38. The higher one of the velocities of the driven wheels WRR and WRL selected by the high-velocity selector 37 is multiplied with a variable $(1-Kr)$ in the weighting section 39.

The driven wheel velocities weighted in the weighting sections 38 and 39 are added to each other by an adder 40 to obtain a driven wheel velocity VR. The driven wheel velocity VR calculated by the adder 40 is outputted to a multiplier 40'. The driven wheel velocity VR is multiplied with $(1+\alpha)$ by the multiplier 40', thus obtaining a target driving wheel velocity V$\phi$ based on the driven wheel velocities VRR and VRL.

Figure 4:
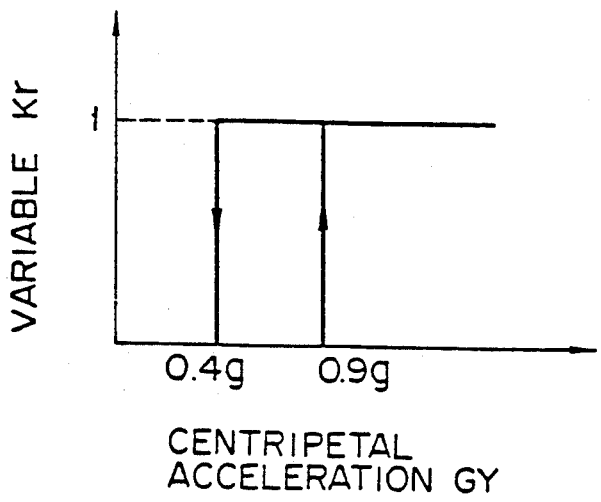
FIG. 4 is a graph showing the relationship between the centripetal acceleration GY and a variable Kr.

The variable Kr changes between "1" and "0" in accordance with the centripetal acceleration GY, as shown in FIG. 4.

The driving wheel velocity VF calculated by the adder 35 and the target driving wheel velocity V$\phi$ calculated by the multiplier 40' are inputted to a subtractor 41. The subtractor 41 subtracts the target driving wheel velocity V$\phi$ from the driving wheel velocity VF to calculate a slip value DVi' $(=VF-V\phi)$. The slip value DVi' is inputted to an adder 42. The adder 42 corrects the slip value DVi' in accordance with the centripetal acceleration GY and its changing rate $\Delta GY$. More specifically, a slip correction value Vg which changes in accordance with the centripetal acceleration GY (FIG. 5) is given from a slip value correction section 43, and a slip correction value Vd which changes in accordance with the changing rate $\Delta GY$ of the centripetal acceleration GY (FIG. 6) is given from a slip value correction section 44. The adder 42 adds the slip value DVi' outputted from the subtractor 41 to the slip correction values Vd and Vg, thus obtaining a slip value DVi. The slip value DVi thus corrected with the centripetal acceleration GY and its changing rate $\Delta GY$ by the adder 42 is sent to a TSn calculating unit 45 and a TPn calculating unit 46, for example, every 15-ms sampling times T.

A calculating section 45a in the calculating unit 45 multiplies the slip values DVi with a coefficient KI to calculate an integral correction torque TSn' (=ΣKI·DVi), which is sent to a coefficient multiplier 45b. The integral correction torque TSn' is a correction value for a torque for driving the driving wheels WFR and WFL. Since a control gain must be adjusted in accordance with a change in characteristics of a power transmission mechanism between the engine 16 and the driving wheels WFR and WFL upon switching of a transmission range, the coefficient multiplier 45b multiplies the integral correction torque TSn' obtained from the calculating section 45a with a coefficient GKi which differs in correspondence with a transmission range, thereby calculating an integral correction torque TSn corrected according to the transmission range. KI is a coefficient which changes according to the slip value DVi.

A calculating section 46a of the TPn calculating unit 46 multiplies the slip value DVi with a coefficient Kp to calculate a proportional correction torque TPn' (=DVi·Kp), which is sent to a coefficient multiplier 46b. As the above integral correction torque TSn', the proportional correction torque TPn' is a correction value for a torque for driving the driving wheels WFR and WFL. Since a control gain must be adjusted in accordance with a change in characteristics of a power transmission mechanism between the engine 16 and the driving wheels WFR and WFL upon switching of a transmission range, the coefficient multiplier 46b multiplies the proportional correction torque TSn' obtained from the calculating section 46a with a coefficient GKp which differs in correspondence with a transmission range, thereby calculating a proportional correction torque TPn corrected according to the transmission range.

The driven wheel velocity VR obtained in the adder 40 is sent as a vehicle velocity VB to a reference torque calculating unit 47. The reference torque calculating unit 47 is to calculate an acceleration torque GB of the vehicle velocity VB in a vehicle acceleration calculating section 47a. The vehicle acceleration VB calculated by the vehicle acceleration calculating section 47a is filtered through a filter 47b to obtain a vehicle acceleration GBF, which is sent to a reference torque calculating section 47c. The reference torque calculating section 47c calculates a reference torque TG (=GBF·W·Re) from the vehicle acceleration GBF, a vehicle weight W, and a radius Re of the wheel. The reference torque TG is an axle torque to be outputted by the engine 16.

The filter 47b is to determine a vehicle acceleration GB preceding in time, in dependence on which the reference torque TG is calculated by the reference torque calculating section 47c, for example, in 3 steps. More specifically, the vehicle acceleration GBF obtained through the filter 47b is calculated from a presently detected vehicle acceleration GBn and a vehicle acceleration $GBF_{n-1}$ as an immediately preceding output of the filter 47b, according to the current slip rate S and acceleration condition.

For example, in order to quickly shift control to control according to a state of a position "2" upon an increase in acceleration, when the slip rate S is in the range of a position "1" shown in FIG. 15, the filter 47b averages $GBF_{n-1}$ as an immediately preceding output of the filter 47 and presently detected $GB_n$ with the same weight to calculate a latest vehicle acceleration GBF by equation (1):

$$GBF_n = (GB_n + GBF_{n-1})/2 \quad (1)$$

When the present acceleration of the vehicle is decreasing and its slip rate S satisfies S>S1 and is shifted from a range "2" to "3" shown in FIG. 15, in order to maintain control according to the state of the range "2" as much as possible, the vehicle acceleration GBF is calculated as a vehicle acceleration $GBF_n$ having a value close to the immediately preceding output $GBF_{n-1}$ of the filter 47b by equation (2):

$$GBF_n = (GB_n + 7GBF_{n-1})/8 \quad (2)$$

Furthermore, when the present acceleration of the vehicle is decreasing and its slip rate S satisfies S≦S1 and is shifted from range "2" to "1" shown in FIG. 15, in order to maintain control according to the state of "2", the immediately preceding output $GBF_{n-1}$ of the filter 47b is further weighted, and the vehicle acceleration GBF is calculated as the vehicle acceleration $GBF_n$ having a value closer to the immediately preceding vehicle acceleration $GBF_{n-1}$ by equation (3) than the case wherein equation (2) is used:

$$GBF_n = (GB_n + 15GBF_{n-1})/16 \quad (3)$$

The reference torque TG calculated by the reference torque calculating unit 47 is outputted to a subtractor 48. The subtractor 48 substracts the integral correction torque TSn calculated by the TSn calculating unit 45 from the reference torque TG obtained in the reference torque calculating unit 47. The subtraction data is further sent to a subtractor 49. The subtractor 49 subtracts the proportional correction torque TPn calculated by the TPn calculating unit 46 from the subtraction data obtained in the subtractor 48, and the subtraction data as a target torque Tφ for an axle torque for driving the driving wheels WFR and WFL is sent to an engine torque converting unit 500 through a switch S1 which is turned on/off by a start/finish judging section 50. That is:

$$T\phi = TG - TSn - TPn$$

The engine torque converting unit 500 divides the target torque Tφ for the driving wheels WFR and WFL given from the subtractor 49 through the switch S1 with a total gear ratio between the engine 16 and the drive axle to convert it into a target engine torque T1. The target engine torque T1 is outputted to a torque converter response delay correction section 501. The torque converter response delay correction section 501 corrects the engine torque T1 in accordance with a response delay of a torque converter (not shown) and outputs a target engine torque T2.

The torque converter response delay correction to the target engine torque T1 is achieved as follows: Wherein T2 is a corrected target engine and Get(s) is a transfer function of the torque converter, T2 is determined by the following calculation:

$$T2 = \left\{ \frac{K}{Get(s)} + (1 - K) \right\} T1 \quad (1)$$

(wherein $0 \leq K \leq 1$)

An example of the transfer function Get(s) is:

$$Get(s) = C[s\,I - A]^{-1} b \quad (2)$$

In the above equation (2), $$A = \begin{bmatrix} -\frac{1}{Ie} \cdot \frac{\partial Tp}{\partial \omega e} & -\frac{1}{Ie} \cdot \frac{\partial Tp}{\partial \omega t} \\ \frac{1}{It} \cdot \frac{\partial Tt}{\partial \omega e} & \frac{1}{It} \cdot \frac{\partial Tt}{\partial \omega e} \end{bmatrix} \quad b = \begin{bmatrix} \frac{1}{Ie} \\ 0 \end{bmatrix}$$

$$C = \begin{bmatrix} \frac{\partial(\lambda \cdot Tp)}{\partial \omega e} & \frac{\partial(\lambda \cdot Tp)}{\partial \omega t} \end{bmatrix}$$

wherein
ωe: an engine rotation speed
ωt: a turbine speed of torque converter
Te: an engine output torque
Tt: a turbine output torque of torque converter
Tp: a pump absorption torque of torque converter
λ: torque factor of torque converter
Ie: a moment of inertia of engine
It: a turbine side moment of inertia of torque converter.

"Wherein ωe is an engine rotation speed, and ωt is a turbine speed of the torque converter, and when the turbine output torque Tt is in equilibrium, the following equations are given in the neighborhood of the equilibrium point:

$$Ie \cdot \Delta\omega e = \frac{\partial Te}{\partial \omega e} \cdot \Delta\omega e - \frac{\partial Tp}{\partial \omega t} \cdot \Delta\omega t + \Delta Tp \quad (3)$$

$$It\Delta\omega t = \frac{\partial Tt}{\partial \omega e} \cdot \Delta\omega e + \frac{\partial Tt}{\partial \omega t} \cdot \Delta\omega t \quad (4)$$

$$\Delta Tt = \frac{\partial\left\{\lambda \cdot \left(\frac{\omega e}{\omega t}\right) \cdot Tp\right\}}{\partial \omega e} \cdot \Delta\omega e + \frac{\partial\left\{\lambda \cdot \left(\frac{\omega e}{\omega t}\right) \cdot Tp\right\}}{\partial \omega t} \cdot \Delta\omega t \quad (5)$$

wherein
Ie: a moment of inertia of engine
Tp: a pump absorption torque of torque converter
λ: a torque factor of torque converter
It: a turbine side moment of inertia of torque converter.

Based on the equations (3), (4), and (5), the transfer function between change in engine output ΔTe and change in turbine output torque ΔTt due to ΔTe is determined:

$$Get(s) = C[s\,I - A]^{-1} b \quad (2)$$

wherein $$A = \begin{bmatrix} -\frac{1}{Ie} \cdot \frac{\partial Tp}{\partial \omega e} & -\frac{1}{Ie} \cdot \frac{\partial Tp}{\partial \omega t} \\ \frac{1}{It} \cdot \frac{\partial Tt}{\partial \omega e} & \frac{1}{It} \cdot \frac{\partial Tt}{\partial \omega e} \end{bmatrix} \quad b = \begin{bmatrix} \frac{1}{Ie} \\ 0 \end{bmatrix}$$

$$C = \begin{bmatrix} \frac{\partial(\lambda \cdot Tp)}{\partial \omega e} & \frac{\partial(\lambda \cdot Tp)}{\partial \omega t} \end{bmatrix}$$

Figure 34:
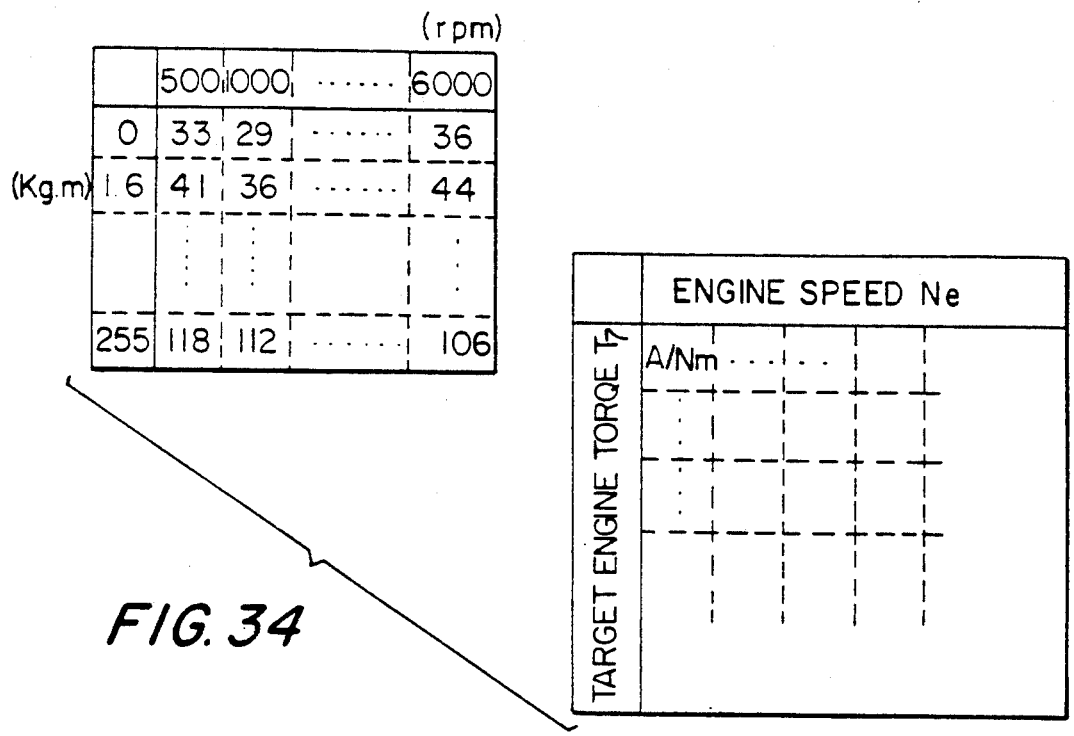
FIG. 34 is a three-dimensional map showing target engine torque T7-engine speed Ne versus an intake air amount A/Nm (mass) per engine revolution.

The target engine torque T2 is outputted to a T/M (transmission) friction correction section 502. In the T/M friction correction section 502, a frictional loss of engine torque in the transmission is added to the target engine torque T2 to obtain a target engine torque T3. The target engine torque T3 is outputted to an external load correction section 503. In the external load correction section 503, a loss of engine torque due to an electrical load such as air conditioner is added to the target engine torque T3 to calculate a target engine torque T4. The target engine torque T4 is outputted to an atmospheric condition correction section 504. In the atmospheric condition correction section 504, the target engine torque T4 is corrected for an atmospheric condition, that is, for an atmospheric pressure AP to obtain a target engine torque T5. Furthermore, the target engine torque T5 is outputted to an operation condition correction section 505. In the operation condition correction section 505, the target engine torque T5 is corrected for an operation condition of the engine such as an engine cooling water temperature WT and a resulting target engine torque T6 is outputted to a lower limit setting section 506. The lower limit setting section 506 sets a lower limit of the target engine torque T6 to a lower limit Tlim which varies according to an elapse time t from the beginning of traction control, as shown in FIG. 16 and FIG. 17, and outputs a target engine torque T7 to a target air amount calculating section 507. The target air amount calculating section 507 calculates a target air amount A/Nm (mass) per engine revolution of the engine 16 to output the target engine torque T7. In the target air amount calculating section 507, a three-dimensional map shown in FIG. 34 is referred to based on the engine speed Ne and the target engine torque T7 to obtain the target air amount (mass) A/Nm. That is, the amount A/Nm is calculated by:

$$A/Nm = f[Ne, T7]$$

wherein A/Nm is the intake air amount (mass) per engine revolution cycle, and f[Ne, T7] is the three-dimensional map having the engine speed Ne and the target torque T7 as parameters.

Figure 36:
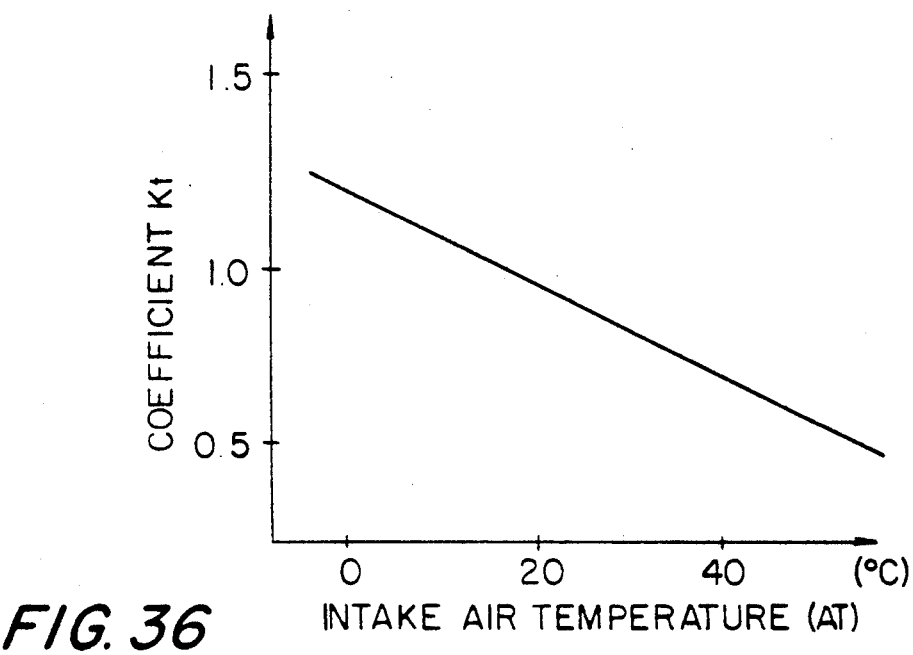
FIG. 36 is a graph showing a coefficient Kt of an intake air temperature.
Figure 37:
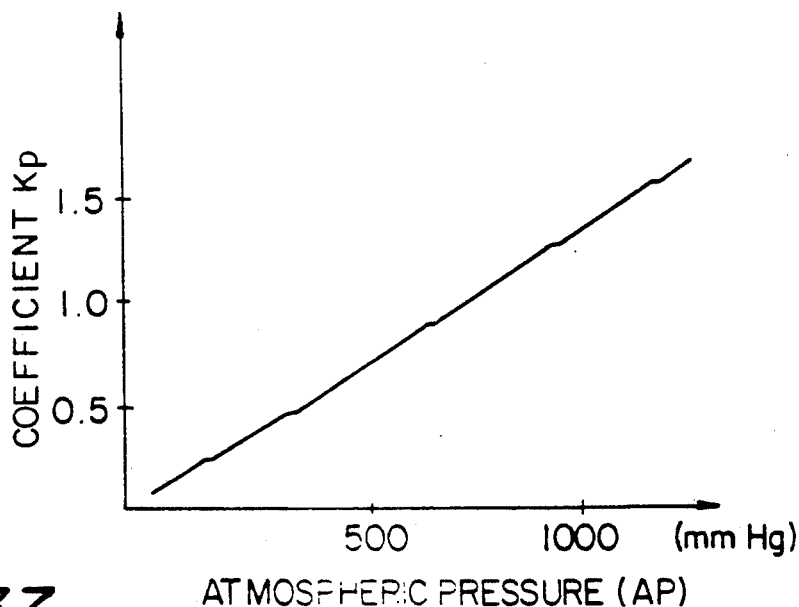
FIG. 37 is a graph showing a coefficient Kp as a function of an atmospheric pressure.

The target air amount calculating section 507 further corrects the intake air amount (mass) A/Nm in accordance with an intake air temperature and an atmospheric pressure to convert it into an intake air amount (volume) A/Nv under a standard atmospheric condition, by the following equation:

$$A/Nv = (A/Nm)/\{Kt(AT) \cdot Kp(AT)\}$$

wherein A/Nv is the intake air amount (volume) per engine revolution cycle, Kt is the density correction coefficient which changes as a function of an intake air temperature (AT) as a parameter (FIG. 36), and Kp is the density correction coefficient which changes as a function of an atmospheric pressure (AP) as a parameter (FIG. 37).

Figure 38:
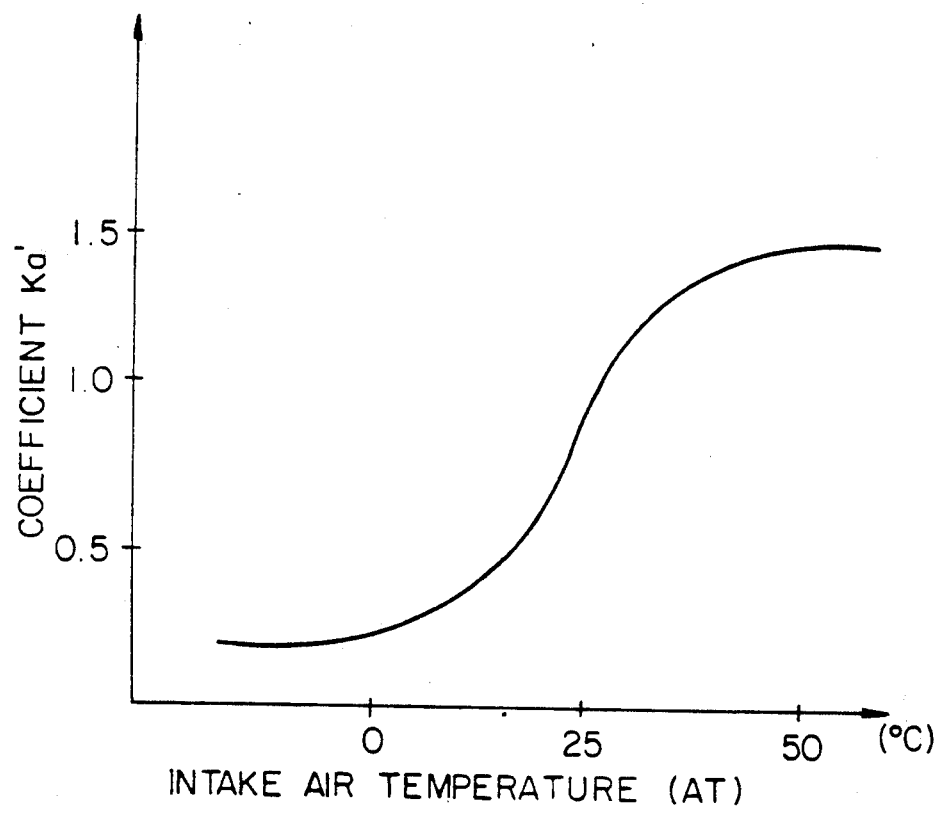
FIG. 38 is a graph showing a coefficient Ka' as a function of an intake air temperature.

The target intake air amount (volume) A/Nv is sent to a target air amount correction section 508, where it is corrected in accordance with an intake air temperature to obtain a target air amount A/NO by the following equation:

$$A/NO = A/Nv \cdot Ka'(AT)$$

wherein A/NO is the corrected target air amount, A/Nv is the non-corrected target air amount, and Ka' is the correction coefficient according to the intake air temperature (AT) (FIG. 38).

Figures 39, 40:
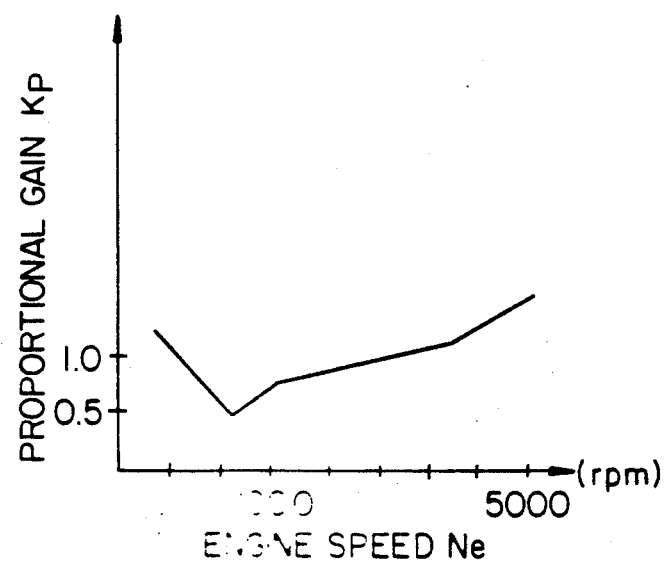
FIG. 39 is a three-dimensional map showing target air amount A/No-main throttle valve opening $\theta 1$ versus an opening $\theta 2'$ of a sub throttle valve THs.
FIG. 40 is a graph showing a proportional gain Kp as a function of an engine speed.

The target air amount A/NO is supplied to an target throttle opening calculating section 509, and a three-dimensional map shown in FIG. 39 is referred to, thus obtaining a target throttle opening $\theta 2'$ corresponding to the target air amount A/NO and the opening $\theta 1$ of the main throttle valve THm. The three-dimensional map shown in FIG. 39 is obtained as follows. Intake air amounts per engine revolution cycle when the main throttle valve THm opening $\theta 1$ or the sub throttle valve THs opening $\theta 2$ is varied are collected as data to determine the sub throttle valve THs opening $\theta 2$ as a function of the main throttle valve THm opening and the intake air amount per engine revolution cycle, thereby obtaining a map.

The target throttle opening $\theta 2'$ is sent to an opening correction section 510 for a bypass air amount, where it is subtracted with a $\Delta \theta$ corresponding to an air amount passing through bypass paths 52b and 52c, thus calculating the target throttle opening $\theta 2$ of the sub throttle valve THs.

The corrected target air amount A/NO outputted from the target air amount correction section 508 is also supplied to a subtractor 513. The subtractor 513 calculates a difference $\Delta A/N$ between the target air amount A/NO and the present air amounted detected by the air flow sensor every predetermined sampling time. The difference $\Delta A/N$ is supplied to a PID controller 514. The PID controller 514 calculates an opening correction value $\Delta \theta 2$ of the sub throttle valve THs corresponding to $\Delta A/N$. The sub throttle valve opening correction value $\Delta \theta 2$ is supplied to an adder 515. The opening correction value $\Delta \theta 2$ obtained in the PID controller 514 is obtained by adding an opening correction value $\Delta \theta p$ by proportional control, an opening correction value $\Delta \theta i$ by integral control, and an opening correction value $\Delta \theta d$ by differential control. That is, $\Delta \theta 2$ is given by:

$$\Delta \theta 2 = \Delta \theta p + \Delta \theta i + \Delta \theta d$$

$$\Delta \theta p = Kp(Ne)^* Kth(Ne)^* \Delta A/N$$

$$\Delta \theta i = Ki(Ne)^* Kth(Ne)^* \Sigma(\Delta A/N)$$

$$\Delta \theta d = Kd(Ne)^* Kth(Ne)^* \{\Delta A/N - \Delta A/Nold\}$$

wherein Kp, Ki, and Kd are a proportional gain (FIG. 40), an integral gain (FIG. 41), and a differential gain (FIG. 42) as a function of the engine speed Ne as a parameter, Kth is a $\theta A/N \rightarrow \Delta \theta$ converting gain (FIG. 43) as a function of the engine speed Ne as a parameter, $\Delta A/N$ is the deviation between the target air amount A/NO and the measured A/N, and $\Delta A/Nold$ is $\Delta A/N$ at the immediately preceding sampling timing.

The adder 515 adds the target throttle opening $\theta 2$ corrected in the opening correction section 510 to the sub throttle valve opening correction value $\Delta \theta 2$ calculated by the PID controller 514 to obtain a feedback-corrected target opening $\theta f$. The target opening $\theta f$ is sent as a sub throttle valve opening signal $\theta s$ to a motor drive circuit 52. The motor drive circuit 52 controls the rotation of a motor 52m so that the sub throttle valve opening $\theta 2$ of the sub throttle valve THs detected by a throttle position sensor TPS2 is equal to an opening corresponding to the sub throttle valve opening signal $\theta s$.

The wheel velocities VRR and VRL of the driven wheels are supplied to a centripetal acceleration calculating section 53 to calculate a centripetal acceleration GY' for judging a degree of turning. The centripeal acceleration GY' is supplied to a centripetal acceleration correction section 54 and is corrected in accordance with the vehicle velocity, as GY=Kv·GY', wherein Kv is a coefficient which changes according to the vehicle speed as shown in FIGS. 7 to 12.

The higher driven wheel velocity outputted from the high-velocity selector 37 is subtracted from the wheel velocity VFR of the right driving wheel by a subtractor 55. The higher driven wheel velocity outputted from the high-velocity section 37 is subtracted from the wheel velocity VFL of the left driving wheel by a subtractor 56.

The output from the subtractor 55 is multiplied with KB (0<KB<1) by a multiplier 57, and the output from the subtractor 56 is multiplied with (1−KB) by a multiplier 58. Thereafter, the products from these multipliers are added to each other by an adder 59, thus obtaining a slip value DVFR of the right driving wheel. At the same time, the output from the subtractor 56 is multiplied with KB by a multiplier 60, and the output from the subtractor 55 is multiplied with (1−KB) by a multiplier 61. Thereafter, the products from these multipliers are added to each other by an adder 62, thus obtaining a slip value DVFL of the left driving wheel. The variable KB changes according to an elapse time from the beginning of traction control, as shown in FIG. 13. At the beginning of the traction control, the variable KB is set to be "0.5," and approaches "0.8" as the traction control progresses.

The slip value DVFR of the right driving wheel is differentiated by a differential section 63 to calculate its changing value as a function of time, i.e., a slip acceleration GFR. The slip value DVFL of the left driving wheel is differentiated by a differential section 64 to calculate its changing value as a function of time, i.e., a slip acceleration GFL. The slip acceleration GFR is supplied to a braking hydraulic pressure variation ($\Delta P$) calculating section 65, and a GFR(GFL)−$\Delta P$ conversion map shown in FIG. 14 is referred to, thereby calculating a variation $\Delta P$ of a braking hydraulic pressure for suppressing the slip acceleration GFR. The variation $\Delta P$ of the braking hydraulic pressure is supplied to a $\Delta P$-T converting section 67 through a switch S2 which is ON/OFF-controlled by the start/finish judging section 50, thereby calculating an open time T of the inlet valve 17i shown in FIG. 1(A). Similarly, the slip acceleration GFL is supplied to a braking hydraulic pressure variation ($\Delta P$) calculating section 66, and the GFR(GFL)−$\Delta P$ conversion map shown in FIG. 14 is referred to, thereby calculating a variation $\Delta P$ of a braking hydraulic pressure for suppressing the slip acceleration GFL. The variation $\Delta P$ of the braking hydraulic pressure is supplied to a $\Delta P$-T converting section 68 through a switch S3 which is ON/OFF-controlled by the start/finish judging section 50, thereby calculating an open time T of the inlet valve 18i shown in FIG. 1(A). The inlet and outlet valves 17i and 18i are opened for the open time T calculated above to brake the right and left driving wheels WFR and WFL.

Note that the switches S1 to S3 are turned on/off in cooperation with each other by the start/finish judging section 50.

The slip value DVi' calculated by the subtractor 41 is supplied to a differential section 41a to calculate a changing rate ΔDVi' of the slip value DVi'. The changing rate ΔDVi' of the slip value DVi', the opening θ2 of the sub throttle valve THs, and an output torque Te of the engine 16 detected by a torque sensor (not shown) are outputted to the start/finish judging section 50. The start/finish judging section 50, when the slip value DVi', its changing rate ΔDVi', and the engine torque Te exceed individual reference values, closes the switches S1 to S3 to start control, and when the opening θ2 of the sub throttle valve THs exceeds a predetermined reference value or when the DVi' becomes smaller than a predetermined reference value (different from the above reference value), opens the switches S1 to S3 to finish the control.

In FIG. 14, when braking is performed during turning, the conversion value for the inner driving wheel during turning changes as indicated by a broken line a to strengthen braking of the inner driving wheel during turning.

The vehicle engine output control operation of the first embodiment of the present invention with the above arrangement will be described below. In FIGS. 1 and 2, the wheel velocities of the driven wheels (rear wheels) outputted from the wheel velocity sensors 13 and 14 are inputted to the low-velocity selector 36, the high-velocity selector 37, and the centripetal acceleration calculating section 53. The low-velocity selector 36 selects a lower wheel velocity of the right and left driven wheels, and the high-velocity selector 37 selects a higher wheel velocity of the right and left driven wheels. During normal straight travel, when the wheel velocities of the right and left driven wheels are equal to each other, the low-velocity selector 36 and the high-velocity selector 37 output the same wheel velocity. The centripetal acceleration calculating section 53 receives the wheel velocities of the right and left driven wheels, and calculates a degree of turning when the vehicle makes a turn on the basis of those wheel velocities of the right and left driven wheels, i.e., a degree of abrupt turning.

How to calculate the centripetal acceleration in the centripetal acceleration calculating section 53 will be described below. In a front-drive vehicle, since the rear wheels are driven wheels, a vehicle velocity at that position can be detected by the wheel velocity sensors regardless of a slip caused by the driving force. Therefore, an Ackerman geometry can be utilized. More specifically, during steady turning, the centripetal acceleration GY' is given by:

$$GY' = v^2/r \quad (4)$$

(v=vehicle velocity, r=radius of turning)

Figure 19:
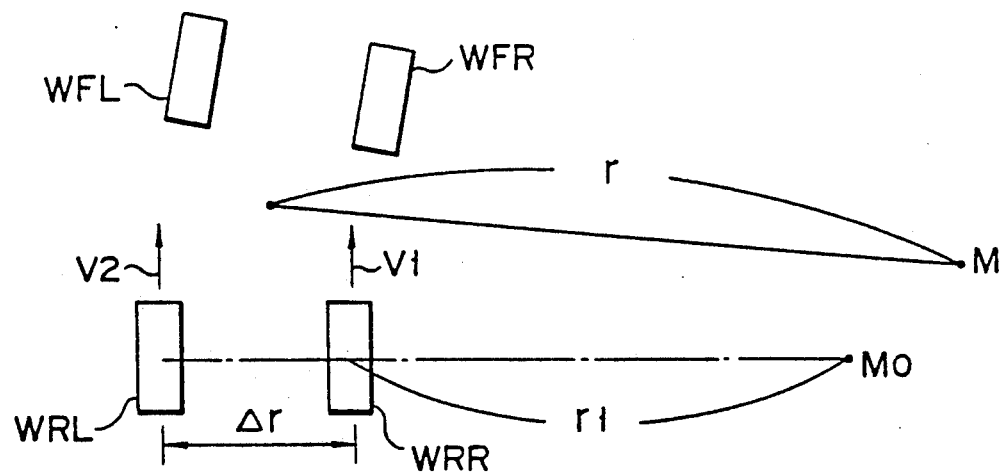
FIG. 19 is a view showing a vehicle turning state.

For example, as shown in FIG. 19, when the vehicle makes a right turn, if the center of turning is represented by Mo, a distance from the center Mo of turning to an inner wheel side (WRR) is represented by r1, a tread is represented by Δr, a wheel velocity of the inner wheel side (WRR) is represented by v1, and a wheel velocity of an outer wheel side (WRL) is represented by v2, the following equation is established:

$$v2/v1 = (\Delta r + r1)/r1 \quad (5)$$

When equation (5) is modified, $$1/r1 = (v2-v1)/\Delta r \cdot v1 \quad (6)$$

The centripetal acceleration GY' with reference to the inner wheel side is given by:

$$\begin{aligned} GY' &= v1^2/r1 \\ &= v1^2 \cdot (v2-v1)/\Delta r \cdot v1 \\ &= v1 \cdot (v2-v1)/\Delta r \end{aligned} \quad (7)$$

More specifically, the centripetal acceleration GY' is represented by equation (7). During turning, since the wheel velocity v1 of the inner wheel side is smaller than the wheel velocity v2 of the outer wheel side and the centripetal acceleration GY' is calculated using the wheel velocity v1 of the inner wheel side, the centripetal acceleration GY' is calculated to be smaller than actual one. Therefore, the coefficient KG of the weighting section 33 is estimated to be smaller since the centripetal acceleration GY' is estimated to be smaller. Therefore, since the driving wheel velocity VF is estimated to be smaller, the slip value DV' (=VF−Vφ) is also estimated to be smaller. Thus, since the target torque Tφ is estimated to be larger, the target engine torque is estimated to be larger, so that a sufficient driving force can be given during turning.

Figure 8:
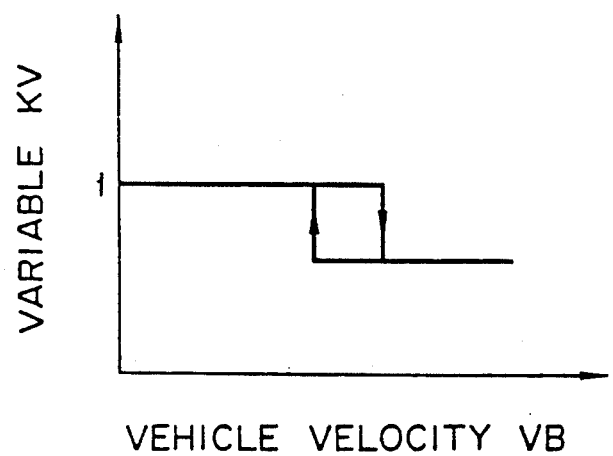
Figure 9:
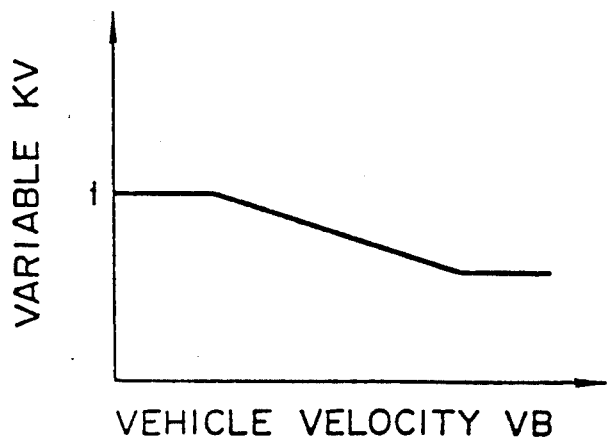

As shown in FIG. 19, although the distance from the inner wheel side to the center Mo of turning is r1 at an extremely low speed, the center of turning is shifted to M in a vehicle which tends to understeer as a speed is increased, and the distance become r(r<r1). In this manner, when the speed is increased, since the radius of turning is calculated as r1, the centripetal acceleration GY' is calculated based on equation (7) to be larger than the actual one. For this reason, the centripetal acceleration GY' calculated by the centripetal acceleration calculating section 53 is sent to the centripetal acceleration correction section 54, and is multiplied with the coefficient Kv shown in FIG. 7 to decrease the centripetal acceleration GY at a high speed. The variable Kv is set to be decreased in accordance with the vehicle velocity, but may be set, as shown in FIG. 8 or FIG. 9. In this manner, the corrected centripetal acceleration GY is outputted from the centripetal acceleration correction section 54.

Figure 10:
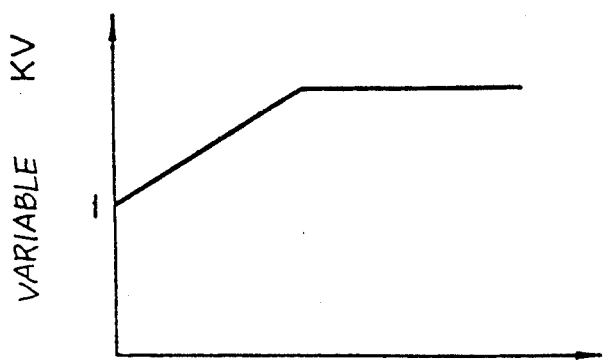
Figure 11:
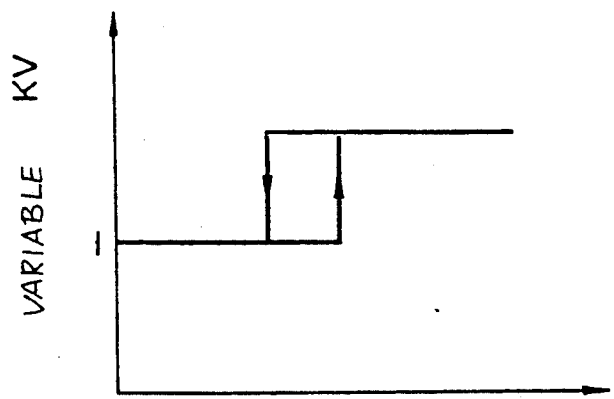
Figure 12:
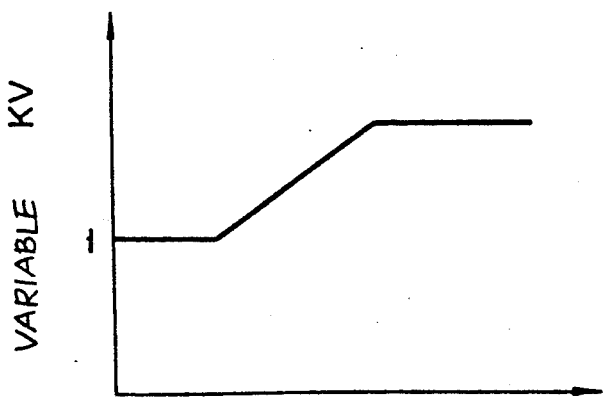

On the other hand, in a vehicle which tends to oversteer as a speed is increased (r<r1), correction quite opposite to the vehicle which tends to understeer is performed by the centripetal acceleration correction section 54. More specifically, one of variables Kv shown in FIGS. 10 to 12 is used, and the centripetal acceleration GY' calculated by the acceleration calculating section 53 is corrected to be increased as the vehicle velocity is increased.

The lower wheel velocity selected by the low-velocity selector 36 is multiplied with the variable Kr by the weighting section 38, as shown in FIG. 4, and the higher wheel velocity selected by the high-velocity selector 37 is multiplied with the variable (1−Kr) by the weighting section 39. The variable Kr is set to be "1" when the centripetal acceleration GY exceeds, e.g., 0.9 g during turning, and is set to be "0" when the centripetal acceleration is decreased to be smaller than 0.4 g.

Therefore, for turning during which the centripetal acceleration GY exceeds 0.9 g, the lower wheel velocity, i.e., inner wheel velocity upon turning is selected from the driven when velocities outputted from the low-velocity selector 36. The wheel velocities outputted from the weighting sections 38 and 39 are added to each other by the adder 40 to obtain the driven wheel velocity VR. The driven wheel velocity VR is multiplied with $(1+\alpha)$ by the multiplier 40', thereby calculating the target driving wheel velocity $V\phi$.

Figure 18:
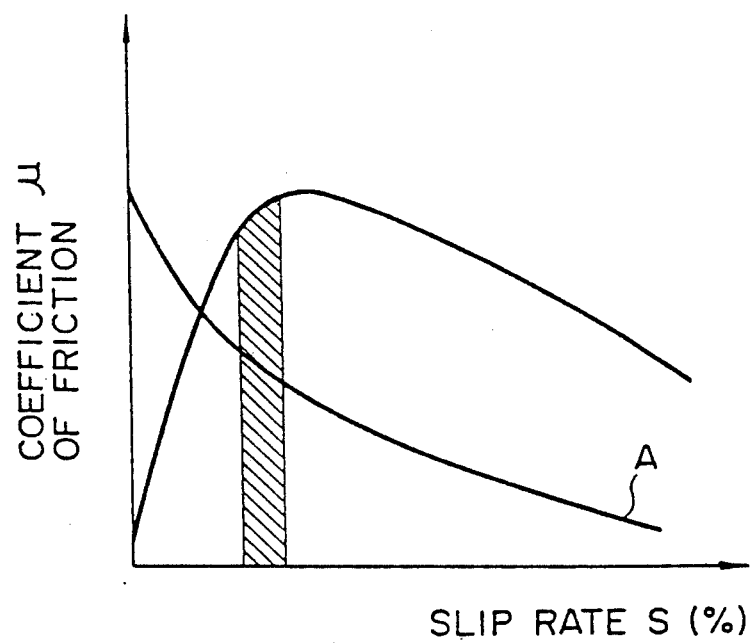

After the higher wheel velocity of the driving wheel velocities is selected by the high-velocity selector 31, the selected velocity is multiplied with the variable KG by the weighting section 33, as shown in FIG. 3. An average wheel velocity (VFR+VFL)/2 of the driving wheels calculated by the averaging section 32 is multiplied with $(1-KG)$ by the weighting section 34. The outputs from the weighting sections 33 and 34 are added to each other by the adder 35 to obtain the driving wheel velocity VF. Therefore, when the centripetal acceleration GY exceeds 0.1 g, since KG=1, the higher driving wheel velocity of the two driving wheel velocities which is outputted from the high-velocity selector 31 is outputted. More specifically, when the degree of turning of the vehicle is increased and the centripetal acceleration GY exceeds 0.9 g, since "KG=Kr=1", the outer wheel side wheel velocity as a higher wheel velocity is selected as the driving wheel velocity VF for the driving wheel side, and the inner wheel side wheel velocity as a lower wheel velocity is selected as the driven wheel velocity VR for the driven wheel side. For this reason, the slip value DVi' (=VF−V$\phi$) calculated by the subtractor 41 is estimated to be larger than that in a straight travel state. Therefore, since the target torque T$\phi$ is estimated to be smaller, the engine output is decreased to be smaller to decrease the slip rate S, thereby increasing a lateral force A, as shown in FIG. 18. As a result, a gripping force of the wheels during turning can be increased, thus assuring safe turning.

Figure 5:
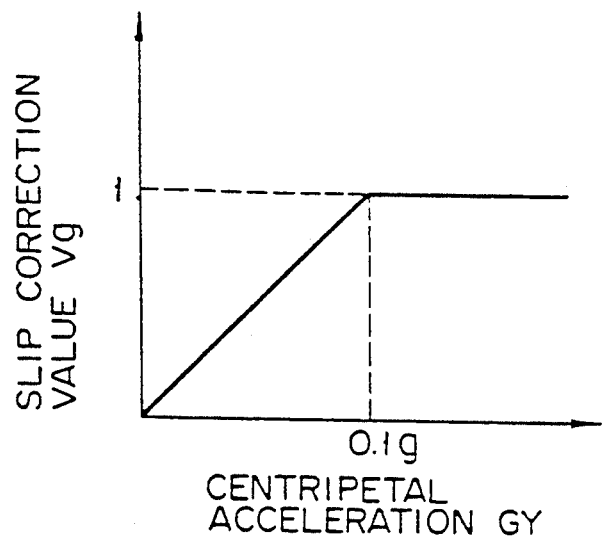
FIG. 5 is a graph showing the relationship between the centripetal acceleration GY and a slip correction value Vg.
Figure 6:
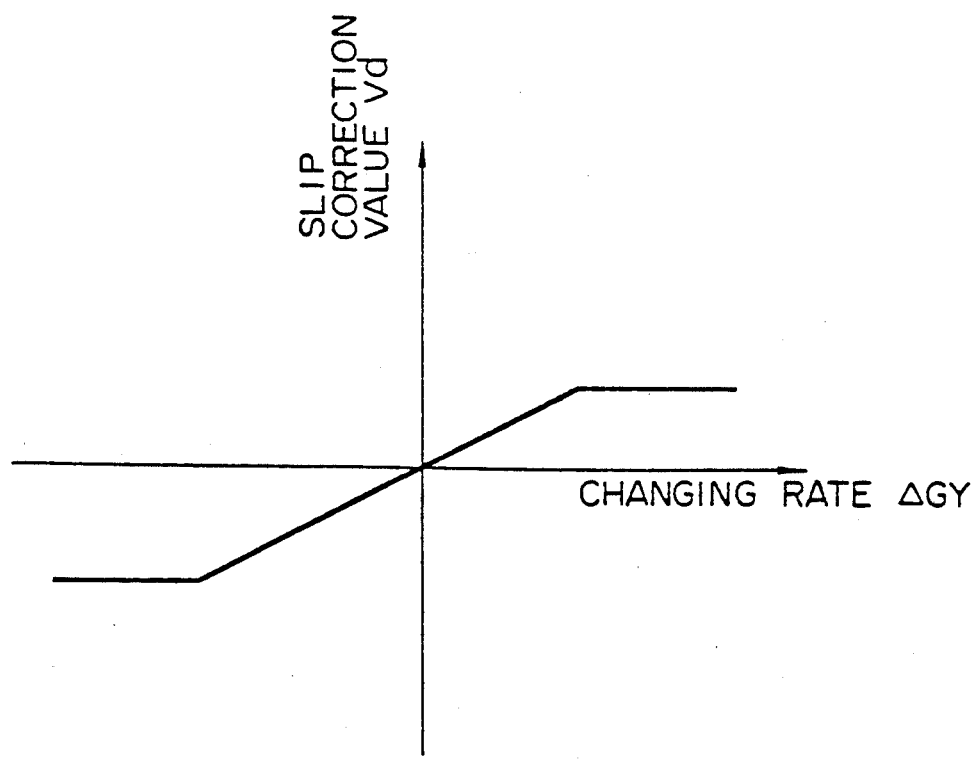
FIG. 6 is a graph showing the relationship between a change $\Delta GY$ in the centripetal acceleration as a function of time and a slip correction value Vd.
Figure 7:
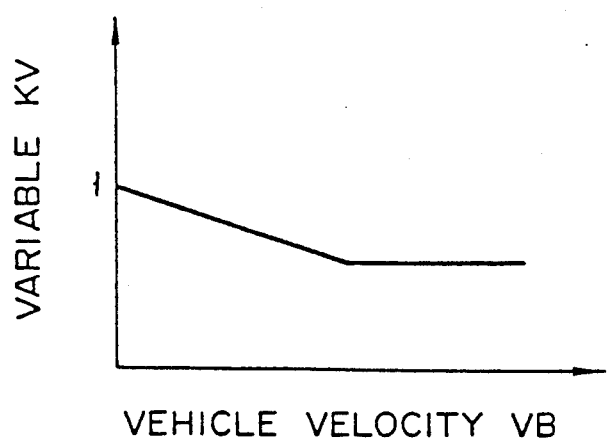
FIGS. 7 to 12 are graphs respectively showing the relationship between a vehicle velocity VB and a variable Kv.

The slip correction value Vg shown in FIG. 5 is added to the slip value DVi' by the slip value correction section 43 only during turning, i.e., only when the centripetal acceleration GY is generated, and the slip value Vd shown in FIG. 6 is added to the sum by the slip value correction section 44. For example, when a vehicle is assumed to make a turn at a right-angle corner, the centripetal acceleration GY and its changing rate $\Delta$GY as a function of time become positive values in the first half of the turn. However, the changing rate $\Delta$GY as a function of time of the centripetal acceleration GY becomes a negative value in the second half of turn. Therefore, in the first half of the turn, the slip correction value Vg (>0) shown in FIG. 5 and the slip correction value Vd (>0) shown in FIG. 6 are added to the slip value DVi' by the adder 42 to yield the slip value DVi. In the second half of the turn, the slip correction value Vg (>0) and the slip correction value Vd (>0) are added to the slip value DVi' to obtain the slip value DVi. Therefore, when the slip value DVi in the second half of the turn is estimated to be smaller than that in the first half of the turn, the engine output is decreased to increase the lateral force in the first half of the turn, and the engine output is recovered to be larger than that in the first half to improve acceleration characteristics of the vehicle in the second half of the turn.

In this manner, the corrected slip value DVi is set to the TSn calculating section 45 at a 15-ms sampling time T. The slip values DVi are integrated while being multiplied with the coefficient KI by the TSn calculating section 45, thereby obtaining the correction torque TSn given by:

$$TSn = GKi \cdot \Sigma KI \cdot DVi$$

(wherein KI is the coefficient which changes according to the slip value DVi) That is, the correction torque obtained by integrating the slip values DVi, i.e., the integral correction torque TSn is calculated.

The slip value DVi is sent to the TPn calculating section 46 every sampling time T, thereby calculating the correction torque TPn given by:

$$TPn = GKi \cdot DVi \cdot Kp$$

(wherein Kp is the coefficient) That is, the correction torque proportional to the slip value DVi, i.e., the proportional correction torque TPn is calculated.

The values of the coefficients GKi and GKp used in calculations of the coefficient multipliers 45b and 46b are switched to values according to the transmitted transmission range after the elapse of a predetermined period of time from the beginning of transmission in a shift-up operation for the following reason. It takes much time from the beginning of transmission until the transmission range is actually switched to complete the transmission operation. If the coefficients GKi and GKp corresponding to a transmitted higher-speed range are used from the beginning of transmission in the shift-up operation, the values of the correction torques TSn and TPn become values corresponding to the higher-speed range, i.e., become smaller than those before the beginning of transmission although the actual transmission operation is not yet completed. For this reason, the target torque T$\phi$ is undesirably increased, and a slip is induced, resulting in unstable control.

The driving wheel velocity VR outputted from the adder 40 is inputted to the reference torque calculating section 47 as the vehicle velocity VB. The vehicle acceleration calculating section 47a calculates the acceleration VB(GB) of the vehicle velocity. The acceleration GB of the vehicle velocity calculated by the vehicle acceleration calculating section 47a is filtered through one of the filters represented by equations (1) to (3) by the filter 47b so that GBF is controlled to an optimal position in accordance with the state of the acceleration GB.

For example, in order to quickly shift control to control according to a state of a position "2" upon an increase in acceleration, when the slip rate S is in the range of a position "1" shown in FIG. 15, $GBF_{n-1}$ as an immediately preceding output of the filter 47b and presently detected $GB_n$ are averaged with the same weight to calculate a latest vehicle acceleration GBF by the above equation (1).

When the present acceleration of the vehicle is decreasing and its slip rate S satisfies S>S1 and is shifted from a range "2" to "3" shown in FIG. 15, in order to maintain control according to the state of the range "2" as much as possible, the vehicle acceleration GBF is calculated as a vehicle acceleration $GBF_n$ more weighted to the immediately preceding output of the filter 47b by equation (2).

Furthermore, when the present acceleration of the vehicle is decreasing and its slip rate S satisfies S$\leq$S1 and is shifted from range "2" to "1" shown in FIG. 15, in order to maintain control according to the state of "2", the immediately preceding output $GBF_{n-1}$ of the filter 47b is further weighted, and the vehicle acceleration GBF is calculated as the vehicle acceleration $GBF_n$ having a value further closer to the immediately preceding output of the filter 47b, as shown in equation (3).

The reference torque calculating section 47c calculates the reference torque TG (=GBF·W·Re).

The integral correction torque TSn is subtracted from the reference torque TG by the subtractor 48, and the proportional correction torque TPn is subtracted from the difference by the subtractor 49. In this manner, the target torque T$\phi$ is calculated as:

$$T\phi = TG - TSn - TPn$$

The target driving wheel torque T$\phi$ is inputted to the engine torque converting unit 500 through the switch S1, and is divided with a total gear ratio between the engine 16 and the drive axle to convert it into the target engine torque T1. The target engine torque T1 is corrected in the torque converter response delay correction section 502 in accordance with a response delay of a torque converter to obtain the target engine torque T2. The target engine torque T2 is outputted to the T/M friction correction section 502. In the T/M friction correction section 502, a frictional loss of engine torque in the transmission is added to the target engine torque T2 to obtain the target engine torque T3.

In the T/M friction correction section 502, the target engine torque T3 is corrected by estimating the T/M warm-up condition by first to seventh procedures described below.

First procedure for T/M friction correction

Figure 20:
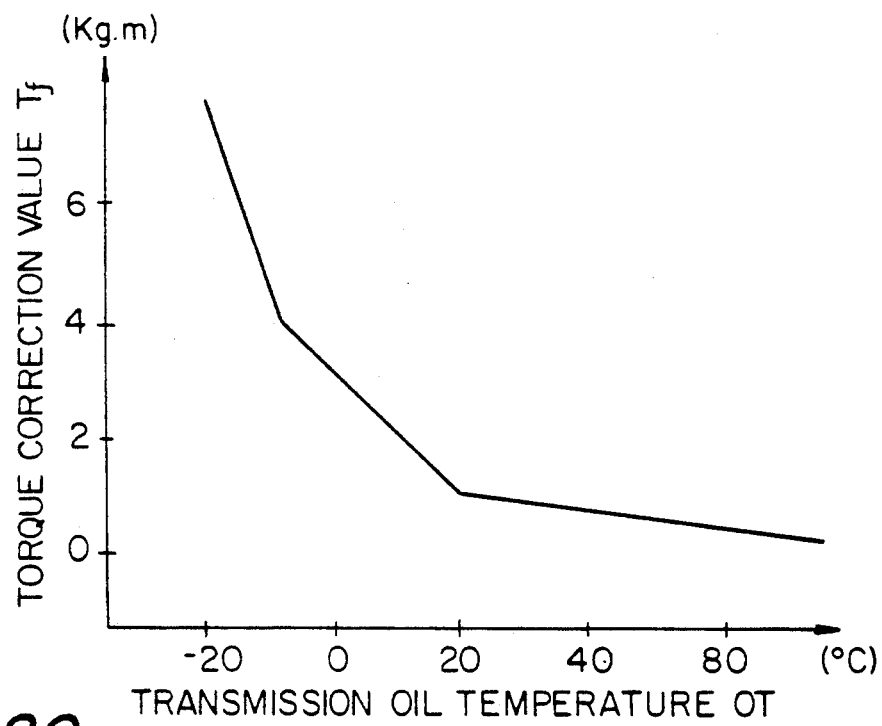
FIG. 20 is a graph showing transmission oil temperature OT-torque correction value Tf characteristics.

In the first procedure, a T/M oil temperature OT is detected by an oil temperature sensor. Since friction is high when the oil temperature OT is low, a map shown in FIG. 20 is referred to, and a torque correction value Tf is added to the target engine torque T2. That is:

$$T3 = T2 + Tf(OT)$$

Since the torque correction value Tf due to friction is determined in accordance with the T/M oil temperature OT, a high-precision T/M friction correction of target engine torque is achieved.

Second procedure for T/M friction correction

A cooling water temperature WT of the engine 16 is measured by a sensor, from which the T/M warm-up condition is estimated to correct the torque. That is:

$$T3 = T2 + Tf(WT)$$

A map (not shown) is referred to and, when the engine cooling water temperature is low, the T/M oil temperature OT is estimated to be low and the torque correction value Tf is set to be high. Since the T/M friction is estimated from the engine cooling water temperature WT, use of a sensor to detect the T/M oil temperature OT is eliminated.

Third procedure for T/M friction correction

Figure 21:
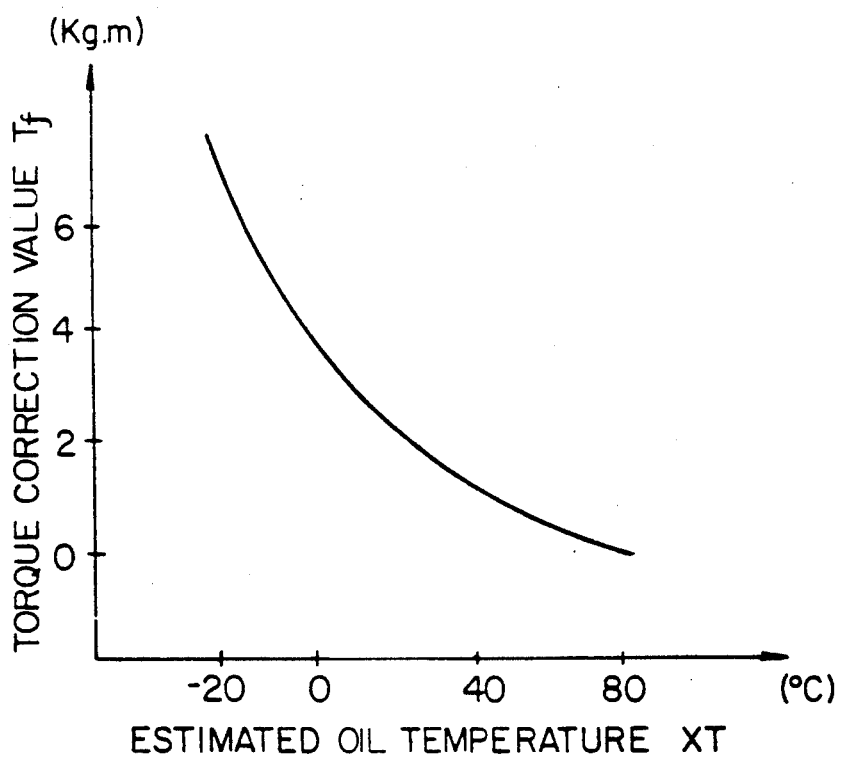
FIG. 21 is a graph showing XT-torque correction value Tf characteristics.
Figure 22:
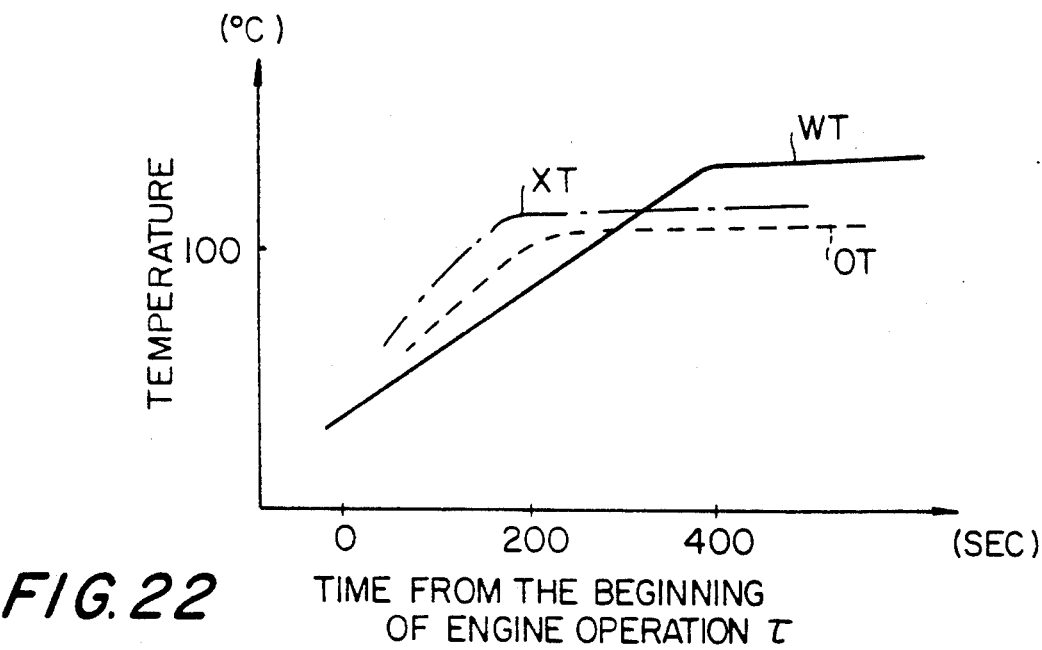
FIG. 22 is a graph showing elapse time $\tau$ from the beginning of engine operation-engine cooling water temperature WT/transmission oil temperature OT characteristics.

A map shown in FIG. 21 is referred to based on a cooling water temperature WTO immediately after the beginning of engine operation and a real-time cooling water temperature WT, and the torque correction value Tf is added to the target engine engine torque T2 to obtain the target engine torque T3. That is:

$$T3 = T2 + Tf(XT)$$

$$XT = WT + KO*(WT - WTO)$$

wherein XT is an estimated T/M oil temperature, and KO is a ratio of an increasing rate of the engine cooling water temperature WT and an increasing rate of the T/M oil temperature. Relationship between the estimated oil temperature XT, the engine cooling water temperature WT, and the Y/M oil temperature OT is shown in FIG. 22. As shown in FIG. 22, changes in estimated oil temperature XT with the elapse time from the beginning of engine operation are almost equal to those in oil temperature OT with the elapse time from the beginning of engine operation. Therefore, the oil temperature can be monitored with a good accuracy without using an oil temperature sensor.

Fourth procedure for T/M friction correction

T3 is calculated from the cooling water temperature WT of the engine 16, the elapse time $\tau$ from the beginning of engine operation and a vehicle velocity Vc as:

$$T3 = T2Tf(WT)*\{1 - Kas(\tau)*Kspeed(Vc)\}$$

wherein Kas is a tailing coefficient related to the elapse time ($\tau$) from the beginning of engine operation (gradually approaching zero with elapse time from the beginning of engine operation), and Kspeed is a tailing operation related to the vehicle velocity (gradually approaching zero with increasing vehicle velocity). When a sufficiently long time is elapsed from the beginning of engine operation or when the vehicle velocity is increased, the term { ... } in the above equation approaches zero. Therefore, when a sufficiently long time elapsed from the beginning of engine operation or when the vehicle velocity is increased, the torque correction value Tf due to T/M friction is eliminated.

Fifth procedure for T/M friction correction

Figure 23:
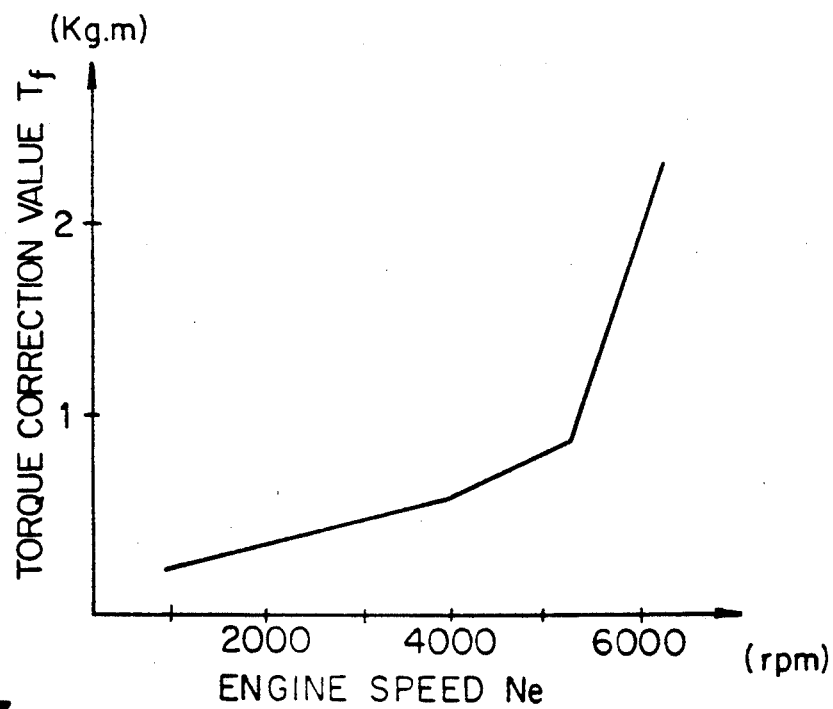
FIG. 23 is a graph showing rotational speed N-torque correction value Tf characteristics.

Output is corrected in accordance with the engine speed or the T/M rotation speed N. A map shown in FIG. 23 is referred to based on the rotation speed N and the torque correction value Tf is calculated on the basis of the rotation speed N. That is:

$$T3 = T2 + Tf(N)$$

This is because as the engine speed or the T/M rotation speed N increases, the T/M oil temperature is increased and a friction loss becomes smaller.

Sixth procedure of T/M friction correction

In this procedure, the correction torque is obtained by estimating from the cooling water temperature of the engine 16 and a cumulative value of intake air amount Q after the beginning of engine operation. The target engine torque is obtained as:

$$T3 + T2 + Tf(WT)*\{1 - \Sigma(Kq*Q)\}$$

wherein Kq is a coefficient to covert the intake air amount into torque loss, which is set to as Kq=Kq1 in the idling state when the clutch is off or the idling SW is on, or to as Kq=Kq0 (>Kq1).

In the above equation, $\Sigma$(Kq * Q) is obtained by multiplying and integrating the intake air amount Q from the beginning of engine operation with the coefficient Kq, and {1−$\Sigma$(Kq * Q)} is multiplied with the torque correction value Tf (WT) based on the engine cooling water temperature WT, the product of which is added to the target engine torque T2. With this correction, when after the engine is started, the vehicle is abruptly accelerated and the intake air amount Q is abruptly increased, that is, the transmission is in a sufficiently warmed-up state even with a low engine cooling water temperature WT and T/M friction correction is not necessary, the term { ... } in the above equation immediately becomes "0" to eliminate unnecessary torque correction. Furthermore, by setting Kq to a small value in the idling state, since the transmission is not sufficiently warmed up after idling is continued, the cumulative value of the intake air amount Q is estimated as small as possible so that the torque correction value Tf based on the engine cooling water is effective. Thus, even when an idling state is continued, the term Tf(WT) in the equation is remained to effect T/M friction correction. Integration of the intake air amount Q every specific time is calculated from the intake air amount A/N per engine revolution cycle.

Alternatively, the T/M friction torque Tf may be calculated using a three-dimensional map shown in FIG. 24. In this case, the target engine torque T3 is given by:

$$T3 = T2 + Tf(WT, \Sigma Qa)$$

In FIG. 24, Tf is set to be "0" when $\Sigma Qa$ exceeds a predetermined value. This is because, when the total of the intake air amount exceeds a predetermined value, it is assumed as T/M oil is sufficiently warmed up and T/M friction becomes negligible when the total of the intake air amount exceeds the predetermined value.

Seventh procedure for T/M friction correction

The torque correction value Tf is obtained from the cooling water temperature WT or the oil temperature of the engine 16 and a running distance $\Sigma Vs$ from the beginning of engine operation. That is:

$$T3 = T2 + Tf(WT) * \{1 - \Sigma(Kv*Vs)\}$$

wherein Kv is a coefficient to convert the running distance ($=\Sigma Vs$) into an output correction. It is set as $Kv = Kv1$ in an idling state where the idling SW is on or the clutch is off, and set as $Kv = Kv2$ ($>Kv1$) for others.

In the above equation, the running distance $\Sigma Vs$ after the beginning of engine operation is multiplied with the correction coefficient Kv and integrated to obtain $\Sigma(Kv*Vs)$ is obtained, $\{1-\Sigma(Kv*Vs)\}$ is multiplied with the torque correction value Tf(WT) based on the engine cooling water temperature WT, and the product is added to the target engine torque T2. With this correction, when the vehicle runs after the beginning of engine operation and the running distance is increased, the term { ... } in the above equation is brought closer to "0" to eliminate unnecessary torque correction.

Furthermore, in an idling state, increase in transmission oil temperature is mild because the transmission load is small, and torque loss in the transmission decreases very slowly. Therefore, in the idling state, Kv is set to a small value so that the term { ... } in the above equation becomes closer slowly to zero to effect the torque correction Tf as long as possible.

The target engine torque T3 outputted from the T/M friction correction section 502 is supplied to the external load correction section 503. In the external load correction section 503, when there is an external load such as air conditioner, the target engine torque T3 is corrected to obtain the target engine torque T4. Correction in the external load correction section 503 is performed using one of the following first to third procedures.

First procedure for external load correction

The target engine torque T3 is corrected in accordance with an air conditioner load to obtain the target engine torque T4. That is:

$$T4 = T3 + TL$$

wherein TL is set to a constant value when the air conditioner is on and to "0" when the air conditioner is off. When there is an air conditioner load, a torque loss TL corresponding to the air conditioner load is added to the target engine torque T3 to obtain the target engine torque T4, thereby preventing the engine output from decreasing due to the air conditioner load.

Figure 25:
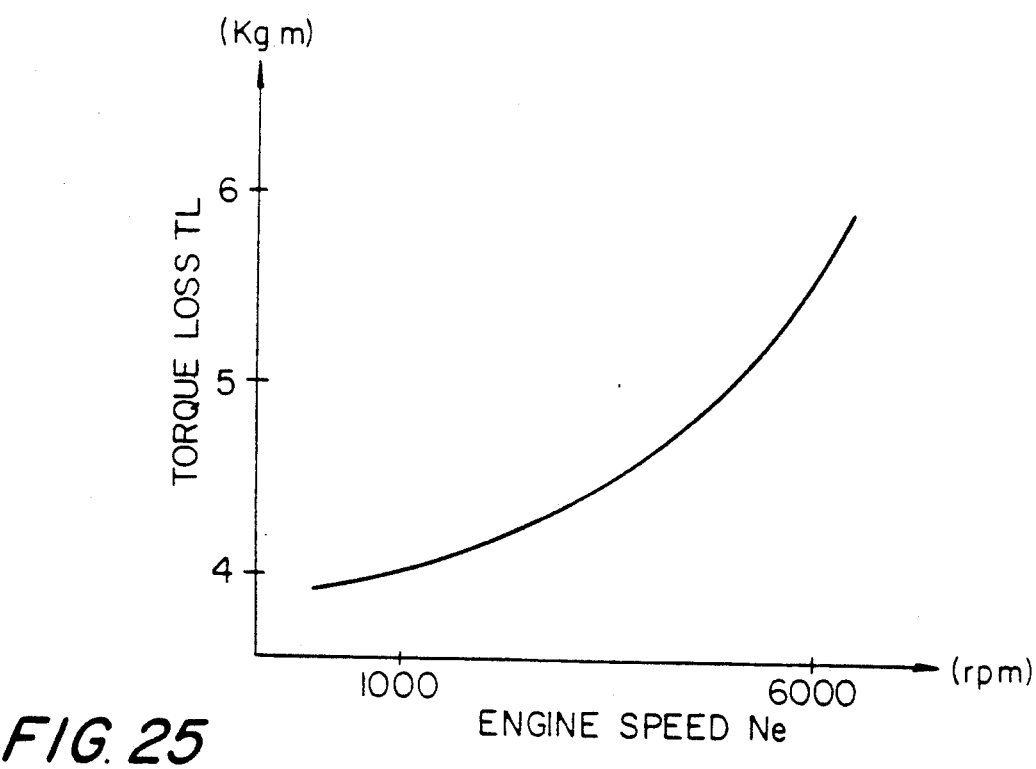
FIG. 25 is a graph showing relationship between a rotational speed Ne and a torque loss TL.

Alternatively, with an eye on the fact that the magnitude of the air conditioner load varies with the engine speed Ne, the torque loss TL relative to the engine speed Ne may be stored in a map to calculate the target engine torque T4, as shown in FIG. 25. That is:

$$T4 = T3 + TL(Ne)$$

Second procedure for external load correction

The target engine torque T3 is corrected in accordance with a power steering load to obtain the target engine torque T4. That is:

$$T4 = T3 + TL$$

wherein TL is set to a constant value when the power steering is on and to "0" when the power steering is off. When there is a power steering load, a torque loss TL corresponding to the power steering load is added to the target engine torque T3 to obtain the target engine torque T4, thereby preventing the engine output from decreasing due to the power steering load.

Figure 26:
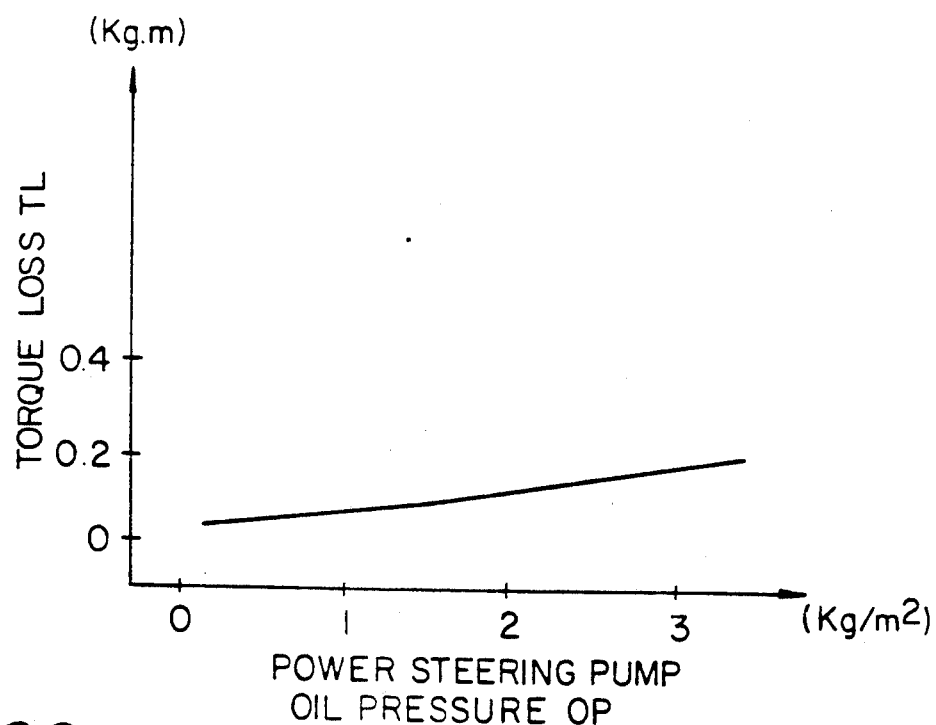
FIG. 26 is a graph showing relationship between a pump oil temperature OP and a torque loss TL.

Alternatively, with an eye on the fact that the magnitude of the power steering load varies with a power steering pump pressure OP, the torque loss TL relative to the power steering pump pressure OP may be stored in a map to calculate the target engine torque T4, as shown in FIG. 26. That is:

$$T4 = T3 + TL(OP)$$

Third procedure for external load correction

The target engine torque T3 is corrected in accordance with an electrical load to obtain the target engine torque T4. Electrical load such as head light and electric fan changes and the power output of an alternator fluctuates. Therefore, a battery voltage or an excitation current of the alternator is detected to estimate the alternator power output and the electrical load.

When the battery voltage is represented by Vb, the target engine torque T4 is given as:

$$T4 = T3 + TL(Vb)$$

As shown in FIG. 27, the torque loss TL relates to the battery voltage Vb. When the battery voltage Vb is low, the electrical load is estimated to be high and the torque loss TL is estimated to be high, thus increasing the target engine torque T4.

Alternatively, the target engine torque T4 is obtained by adding a torque loss as a function of the alternator excitation current (i$\phi$) as a parameter. That is:

$$T4 = T3 + TL(i\phi, Ne)$$

wherein the torque loss TL is obtained by referring to a map shown in FIG. 28.

Further alternatively, a correct value Kal for alternator efficiency relative to the engine speed Ne may be obtained from a chart shown in FIG. 29 to calculate the target engine torque T4 using the following equation:

$$T4 = T3 + TL(i\phi, Ne) \times Kal(Ne)$$

Figure 30:
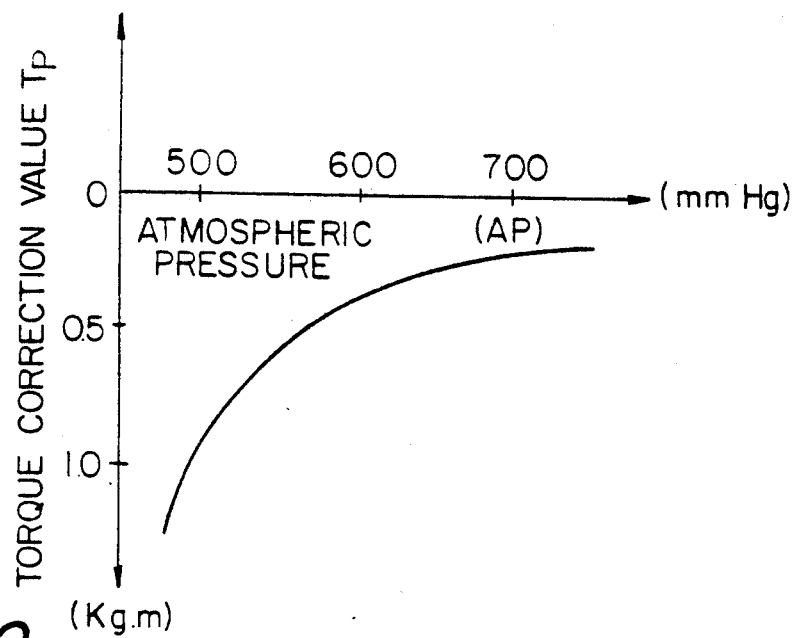
FIG. 30 is a graph showing atmospheric pressure-torque correction value Tp characteristics.

The thus calculated target engine torque T4 is supplied to the atmospheric condition correction section 504 where the target engine torque T4 is corrected in accordance with the atmospheric pressure to obtain the target engine torque T5. That is:

$$T5 = T4 + Tp(AP)$$

wherein Tp is a torque correction value given in a map shown in FIG. 30. In an area such as a highland where the atmospheric pressure is low, since the engine output is increased by an increase in combustion rate due to a decrease in pumping loss or in back pressure, the torque correction value Tp is decreased accordingly.

The target engine torque T5 thus corrected for atmospheric pressure is supplied to the operation condition correction section 505, where the target engine torque T5 is corrected in accordance with the operation condition of the engine, that is, a warm-up condition, to obtain the target engine torque T6. First to fourth procedures to determine the operation condition correction in accordance with the warm-up condition of the engine 16 will be described below.

First procedure for engine operation condition correction

Figure 31:
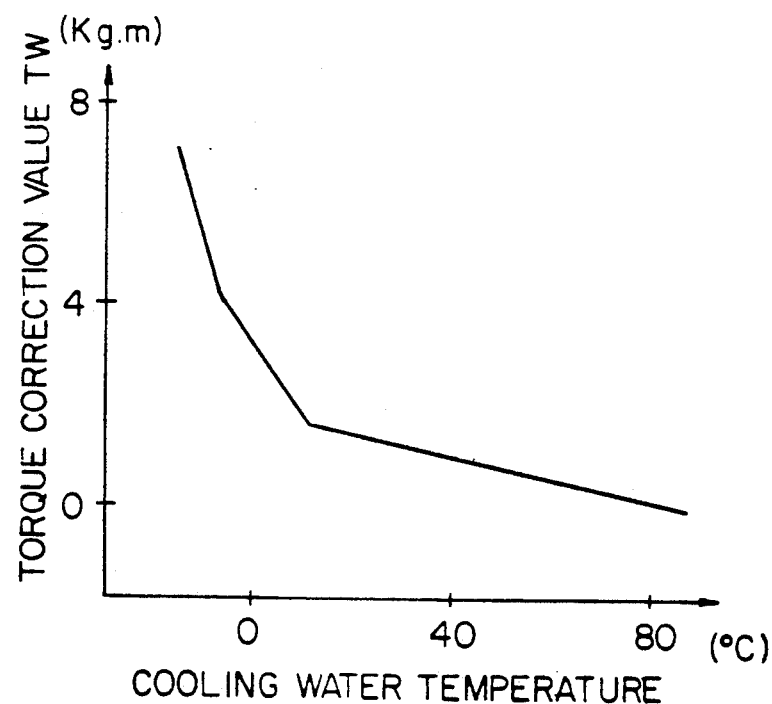
FIG. 31 is a graph showing engine cooling water temperature WT-torque correction value TW characteristics.

This procedure calculates the target engine torque T6 in accordance with the engine cooling water temperature WT, in which a map shown in FIG. 31 is referred to and a torque correction value TW according to the engine cooling water temperature WT is added to the target engine torque T5 to obtain the target engine torque T6. That is:

$$T6 = T5 + TW(WT)$$

As shown in FIG. 31, the engine 16 is insufficiently warmed up when the cooling water temperature WT is low, and the torque correction value TW is increased.

The torque correction value TW may be presented as a map (now shown) with respect to the engine cooling water temperature WT and the engine speed Ne. That is:

$$T6 = T5 + TW(WT, Ne)$$

Second procedure for engine operation condition correction

Figure 32:
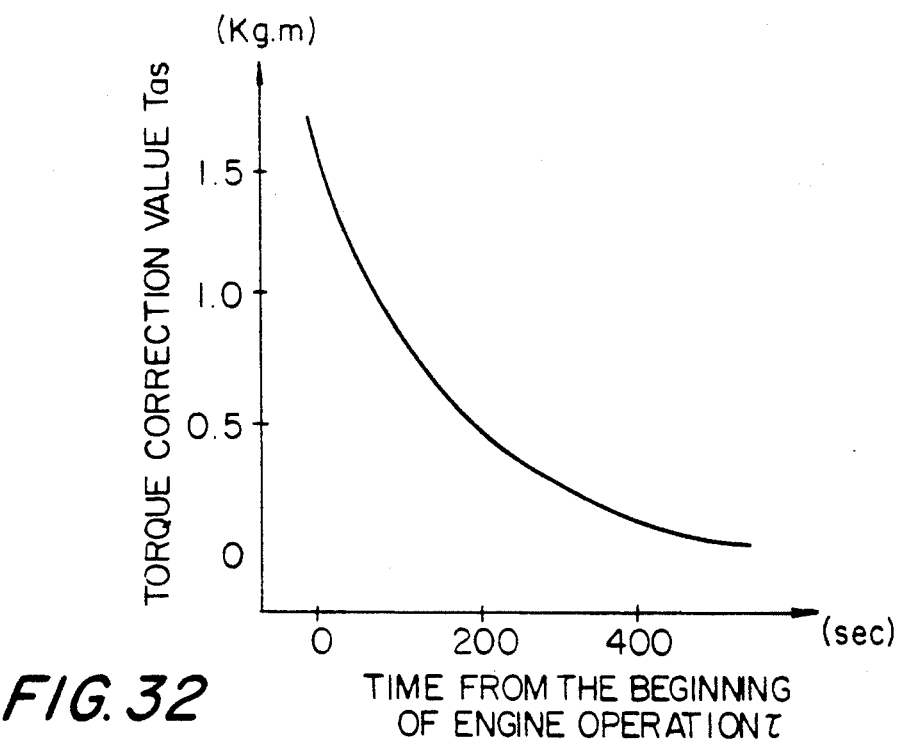
FIG. 32 is a graph showing elapse time $\tau$ from the beginning of engine operation-torque correction value Tas characteristics.

This procedure obtains the target engine torque T6 by adding a torque correction value Tas in accordance with the elapse time $\tau$ as shown in FIG. 32 to the target engine torque T5. That is:

$$T6 = T5 + Tas(\tau)$$

Thus, the warm-up condition of the engine is estimated from the elapse time $\tau$ from the beginning of engine operation.

The torque correction value Tas may be obtained from a three-dimensional map (not shown) determined by the elapse time $\tau$ from the beginning of engine operation and the cooling water temperature WT. That is:

$$T6 = T5 + Tas(\tau)$$

With such a map, a cooling water temperature WTO at the beginning of engine operation is measured and the torque correction value Tas may be determined according to the elapse time $\tau$, or the torque correction value Tas may be determined by measuring a cooling water temperature WT at an elapse time $\tau$.

Third procedure for engine operation condition correction

Figure 33:
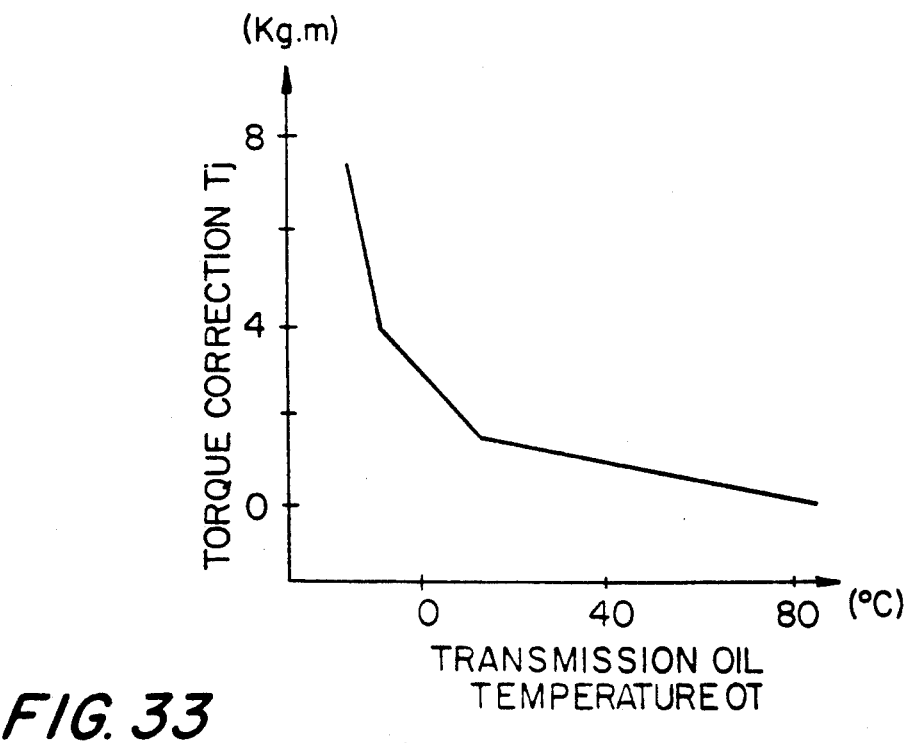
FIG. 33 is a graph showing engine oil temperature-torque correction value Tj characteristics.

In this procedure, a map shown in FIG. 33 is referred to from the engine oil temperature OT to obtain a torque correction value Tj. That is:

$$T6 = T5 + Tj(OT)$$

Thus, the engine cooling water temperature WT is estimated from the engine oil temperature OT to detect the warm-up condition of the engine.

The torque correction value Tj may be obtained from a three-dimensional map (not shown) based on the engine oil temperature OT and the engine speed Ne. That is:

$$T6 = T5 + Tj(OT, Ne)$$

Fourth procedure for engine operation condition correction

In this procedure, the target engine torque T5 is corrected in accordance with the engine cooling water temperature WT, the oil temperature OT, the elapse time $\tau$ from the beginning of engine operation, a combustion chamber wall temperature CT, the intake air amount Q, and part of a cylinder internal pressure CP to obtain the target engine torque T6. That is:

$$T6 = T5 + Tc(CT/CTO)*Kcp(CP/CPO)*\{1 - Kq*\Sigma(Q)\}$$

wherein CT is an engine combustion chamber wall temperature,

CTO is an engine combustion chamber wall temperature at the beginning of engine operation, Tc is a torque correction value in accordance with a ration (CT/CTO) of the engine combustion chamber wall temperature CT and the engine combustion chamber wall temperature CTO at the beginning of engine operation, CP is an engine cylinder internal pressure, CPO is an engine cylinder internal pressure at the beginning of engine operation, Kcp is a correction coefficient in accordance with a ratio of the cylinder internal pressure CP and the cylinder internal pressure CPO at the beginning of engine operation, and Kq is a coefficient to covert an integrated value of intake air amount from the beginning of engine operation into the torque correction coefficient.

The target engine torque T6 corrected as above for the engine operation condition is limited to a value equal to or larger than a lower limit by the lower limit setting section 506. By controlling the lower limit of the target engine torque T6 by referring to FIG. 16 or FIG. 17, the engine is prevented from stalling due to an excessively low target engine torque.

The target engine torque T7 outputted from the lower limit setting section 506 is sent to the target air amount calculating section 507 to calculate a target air amount (mass) A/Nm for outputting the target engine torque T7.

In the target air amount calculating section 507, a three-dimensional map shown in FIG. 34 is referred to based on the engine speed Ne and the target engine torque T7 to calculate the target air amount (mass) A/Nm. That is:

$$A/Nm = f[Ne, T7]$$

wherein A/Nm is the intake air amount (mass) per intake stroke, and f[Ne, T7] is the three-dimensional map having the engine speed Ne and the target engine torque T7 as parameters.

Figure 35:
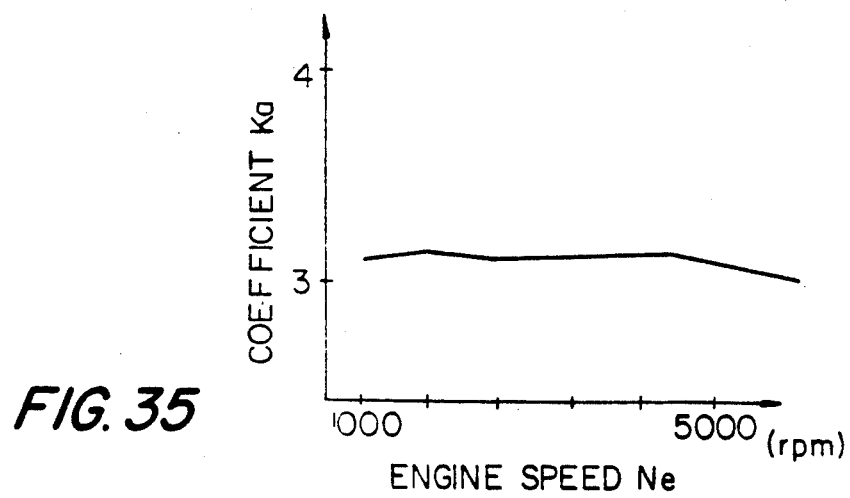
FIG. 35 is a graph showing a coefficient Ka as a function of an engine speed Ne.

Note that A/Nm may be calculated by multiplying a coefficient Ka as shown in FIG. 35 corresponding to the engine speed Ne and the target torque T7. That is, $$A/Nm = Ka(Ne)*T7$$

Furthermore, Ka(Ne) may be given as a constant.

In the target air amount calculating section 507, the intake air amount (mass) A/Nm is further corrected in accordance with an intake air temperature and an atmospheric pressure, thereby converting to an air amount (volume) A/Nv under a standard atmospheric condition. That is:

$$A/Nv = (A/Nm)/\{Kt(AT)*Kp(AT)\}$$

wherein A/Nv is the intake air amount (volume) per engine revolution cycle,

Kt is the density correction coefficient which changes as a function of an intake air temperature (AT) as a parameter, as shown in FIG. 36, and Kp is the density correction coefficient which changes as a function of an atmospheric pressure (AT) as a parameter, as shown in FIG. 37.

The target intake air amount (volume) A/Nv calculated in this manner is corrected in accordance with an intake air temperature by the target air amount correction section 508, thus obtaining the target air amount A/NO. That is, $$A/NO = A/Nv*Ka'(AT)$$

wherein A/NO is the corrected target air amount,

A/Nv is the non-corrected target air amount, and

Ka' is the correction coefficient according to the intake air temperature (AT) (FIG. 38).

The target air amount A/NO outputted from the target air amount correction section 508 is supplied to the target throttle opening calculating section 509, and a map shown in FIG. 39 is referred to, thereby obtaining an opening $\theta 2'$ of the sub throttle valve THs corresponding to the opening $\theta 1$ of the main throttle valve THm and the target air amount A/NO. The sub throttle valve THs opening $\theta 2'$ is supplied to the opening correction section 510, which subtracts the opening $\Delta \theta$ corresponding to an air amount passing through the bypass paths 52b and 52c shown in FIG. 1(B) from the sub throttle valve THs opening $\theta 2'$ to obtain the opening $\theta 2$ of the sub throttle valve THs.

Figure 44:
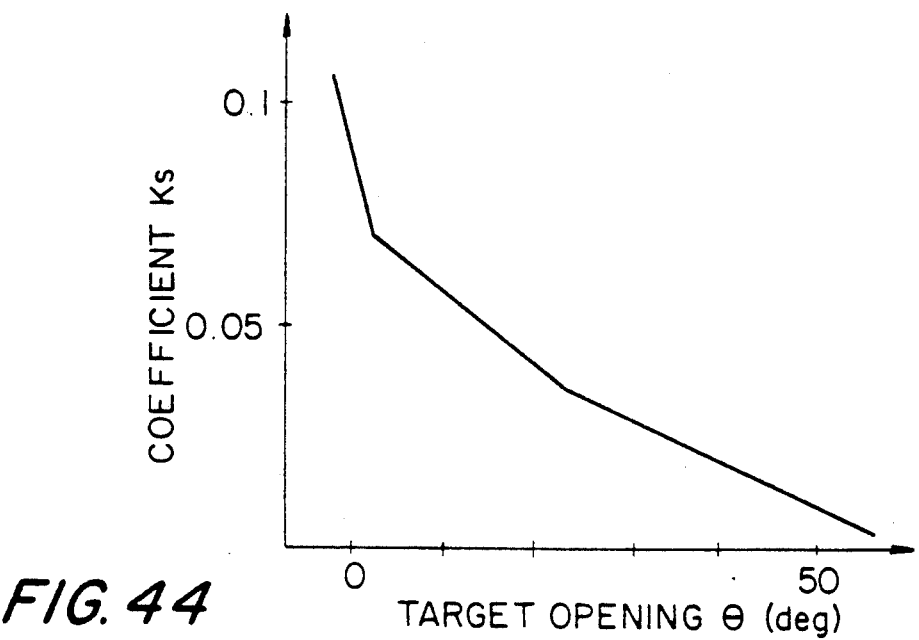
FIG. 44 is a graph showing a target opening $\theta$ versus a coefficient Ks.
Figure 45:
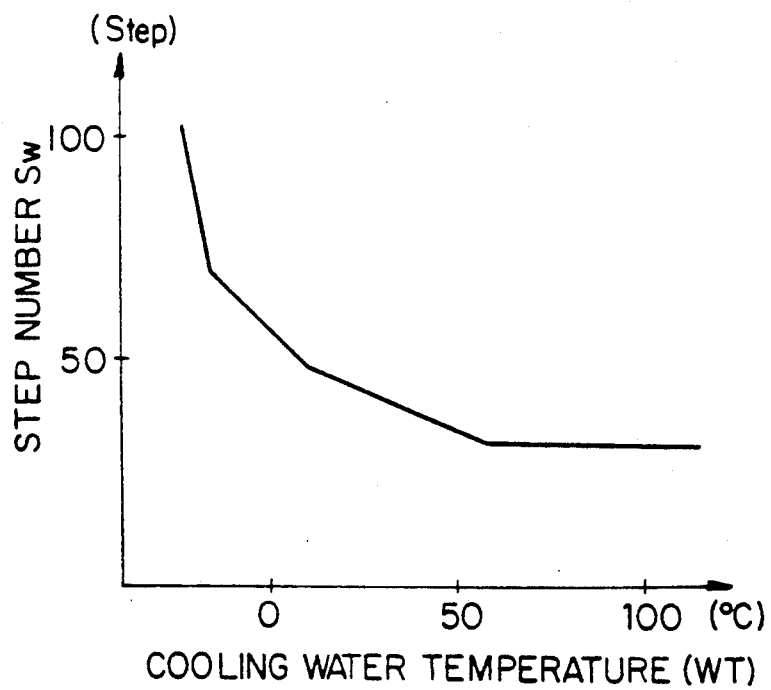
FIG. 45 is a graph showing an engine cooling water temperature WT versus a step number conversion value Sw.

The above $\Delta \theta$ is obtained by the following equation, $$\Delta \theta = Ks(\theta)*\{Sm + Sw(WT)\}$$

wherein a coefficient Ks (FIG. 44) is an opening correction value per step of a stepping motor 52s controlled by an idle speed controller (ISC) (not shown) having the target opening $\theta$ as a parameter, Sm is the number of steps of the stepping motor 52s, and Sw (FIG. 45) is a conversion factor for converting the opening of a wax valve 52W having the engine cooling water temperature WT as a parameter into the number of steps of the stepping motor 52s.

The corrected target air amount A/NO outputted from the target air amount correction section 508 is supplied to the subtractor 513, thus calculating the difference $\Delta A/N$ from the present air amount A/N detected by an air flow sensor every predetermined sampling time. The difference $\Delta A/N$ is sent to the PID controller 514, and PID control is performed on the basis of $\Delta A/N$ to calculate the opening correction value $\Delta \theta 2$ corresponding to $\Delta A/N$. The opening correction value $\Delta \theta 2$ is added to the target throttle opening $\theta 2$ by the adder 51, thereby calculating the feedback-corrected target opening $\theta f$. That is:

$$\theta f = \theta 2 + \Delta \theta 2$$

Figure 41:
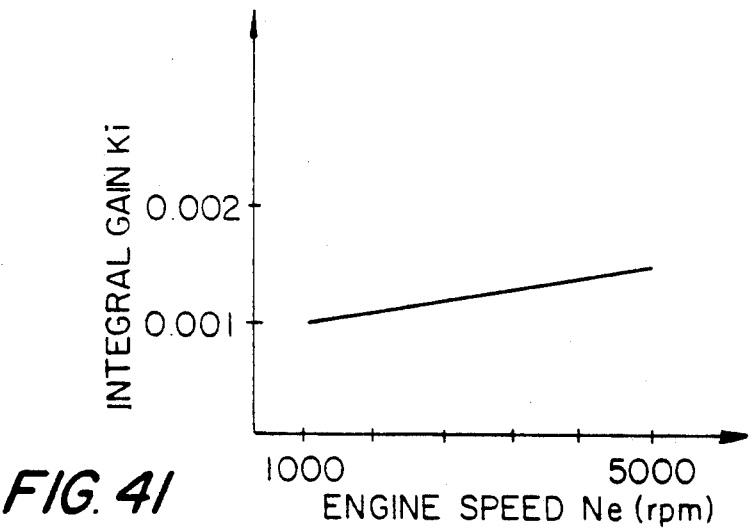
FIG. 41 is a graph showing an integral gain Ki as a function of an engine speed.
Figure 42:
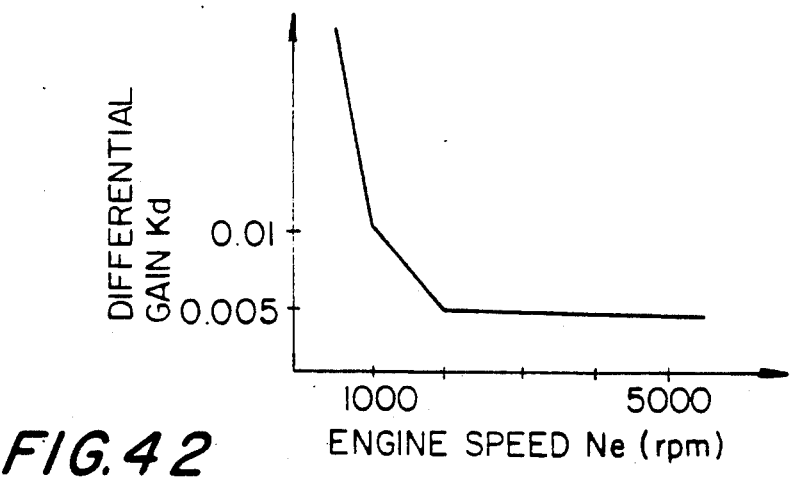
FIG. 42 is a graph showing a differential gain Kd as a function of an engine speed.
Figure 43:
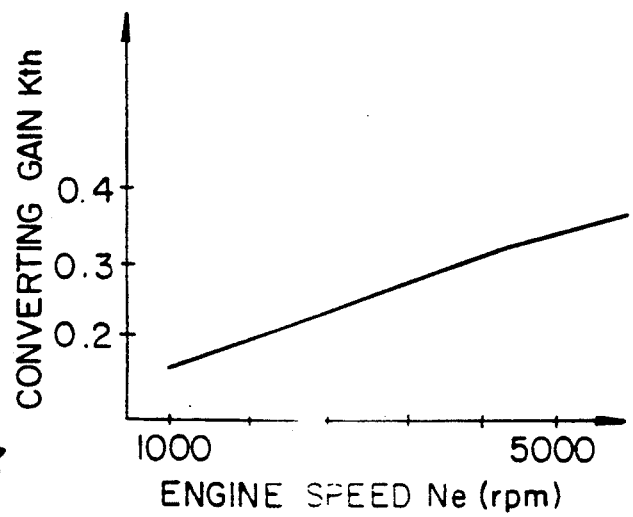
FIG. 43 is a graph showing a converting gain as a function of an engine speed.

The opening correction value $\Delta \theta 2$ is obtained by adding an opening correction value $\Delta \theta p$ by proportional control, an opening correction value $\Delta \theta i$ by integral control, and an opening correction value $\Delta \theta d$ by differential control. That is:

$$\Delta \theta = \Delta \theta p + \Delta \theta i + \Delta \theta d$$

wherein $$\Delta \theta p = Kp(Ne)*Kth(Ne)*\Delta A/N$$

$$\Delta \theta i = Ki(Ne)*Kth(Ne)*\Sigma(\Delta A/N)$$

$$\Delta \theta d = Kd(Ne)*Kth(Ne)*(\Delta A/N - \Delta A/Nold)$$

are calculated by the PID controller 514. Kp, Ki, and Kd are proportional, integral, and differential gains as a function of the engine speed Ne as a parameter, and FIGS. 40 to 42 show their characteristics. Kth is a $\Delta A/N \rightarrow \Delta \theta$ converting gain (FIG. 43) as a function of the engine speed Ne as a parameter, $\Delta A/N$ is a deviation between the target air amount A/NO and the present air amount A/N detected, and $\Delta A/Nold$ is $\Delta A/N$ at the immediately preceding sampling timing.

The target opening $\theta f$ obtained in this manner is supplied to the motor drive circuit 52 as a sub throttle valve opening signal $\theta s$. The motor drive circuit 52 controls the motor 52m so that the opening $\theta 2$ of the sub throttle valve THs detected by the sensor TPS2 is equal to an opening corresponding to the opening signal $\theta s$, thereby controlling the engine output to the target engine torque T7.

The higher drive wheel velocity outputted from the high-velocity selector 37 is subtracted from the driving wheel velocity VFR by the subtractor 55. Furthermore, the higher driven wheel velocity outputted from the high-velocity selector 37 is subtracted from the driving wheel velocity VFL by the subtractor 56. Therefore, the outputs from the subtractors 55 and 56 are estimated to be small than a value for controlling the engine torque, so that the number of times of use of brakes during turning is decreased, thereby eliminating a slip of the driving wheels due to decreasing the engine torque.

The output from the subtractor 55 is multiplied with KB ($0 < KB < 1$) by the multiplier 57. The output of the subtractor 56 is multiplied with ($1 - KB$) by the multiplier 58. Thereafter, the outputs from the multipliers 57 and 58 are added to each other by the adder 59 to obtain the slip value DVFR for the right driving wheel. At the same time, the output from the subtractor 56 is multiplied with KB by the multiplier 60, and the output from the subtractor 55 is multiplied with ($1 - KB$) by the multiplier 61. Thereafter, the outputs from the multipliers 60 and 61 are added to each other by the adder 62, thus obtaining the slip value DVFL for the left driving wheel. The variable KB changes in accordance with an elapse time t from the beginning of traction control, as shown in FIG. 13. The variable KB is set to be "0.5" at the beginning of traction control, and is set to approach "0.8" along with the traction control. When a slip of the driving wheels is eliminated by the brakes, both the wheels are simultaneously braked at the beginning of braking, and an uncomfortable shock at a steering wheel at the beginning of braking on, e.g., a split road can be eliminated. An operation when brake control is continued and KB becomes "0.8" will be described below. In this case, when only one driving wheel slips, it is recognized that the other driving wheel also slips by 20% of one driving wheel, brake control is also performed on the other wheel. If brakes of the left and right driving wheels are independently controlled, when one driving wheel is braked and its rotation speed is decreased, the other driving wheel slips due to the operation of a differential gear and is braked in turn. This operation is undesirably repeated. The slip value DVFR for the right driving wheel is differentiated by the differential section 63, thus calculating its changing value as a function of time, i.e., the slip acceleration GFR. At the same time, the slip value DVFL for the left driving wheel is differentiated by the differential section 64, thus calculating its changing as a function of time, i.e., the slip acceleration GFL. The slip acceleration GFR is sent to the braking pressure variation ΔP calculating section 65, and the GFR(GFL)−ΔP conversion map shown in FIG. 14 is referred to, thus obtaining the variation ΔP of the braking hydraulic pressure for suppressing the slip acceleration GFR.

The variation ΔP is supplied to the ΔP-T converting section 67 for calculating the open time T of the inlet valve 17i when the switch S2 is closed, i.e., when the start/finish judging section 50 judges the control start condition is established. The valve open time T calculated by the ΔP-T converting section 67 is set as a brake operation time FR for the right driving wheel WFR. Similarly, the slip acceleration GFL is sent to the braking pressure variation ΔP calculating section 66, and the GFR(GFL)−ΔP conversion map shown in FIG. 14 is referred to, thus obtaining the variation ΔP of the braking hydraulic pressure for suppressing the slip acceleration GFL. The variation ΔP is supplied to the ΔP-T converting section 68 for calculating the open time T of the inlet valve 18i when the switch S3 is closed, i.e., when the start/finish judging section 50 judges the control start condition is established. The valve open time T calculated by the ΔP-T converting section 68 is set as a brake operation time FL for the left driving wheel WFL. Thus, further slips of the right and left driving wheels WFR and WFL can be suppressed.

In FIG. 14, when braking is performed during turning, the variation ΔP changes as indicated by a broken line a to strengthen braking of the inner driving wheel during turning. In this manner, although the inner wheel side tends to slip since the weight is shifted to the outer wheel side during turning, the inner wheel side can be prevented from slipping by setting the variation ΔP of the braking hydraulic pressure of the inner wheel side to be larger than that of the outer wheel side.

A second embodiment of the present invention will now be described. FIG. 2(C) shows a control block diagram of the second embodiment.

In the second embodiment, the calculation steps from the calculation of the target torque Tφ to the calculation of the target air amount A/NO from the target torque Tφ by the target air amount correction section 508 are the same as those in the first embodiment.

Figure 46:
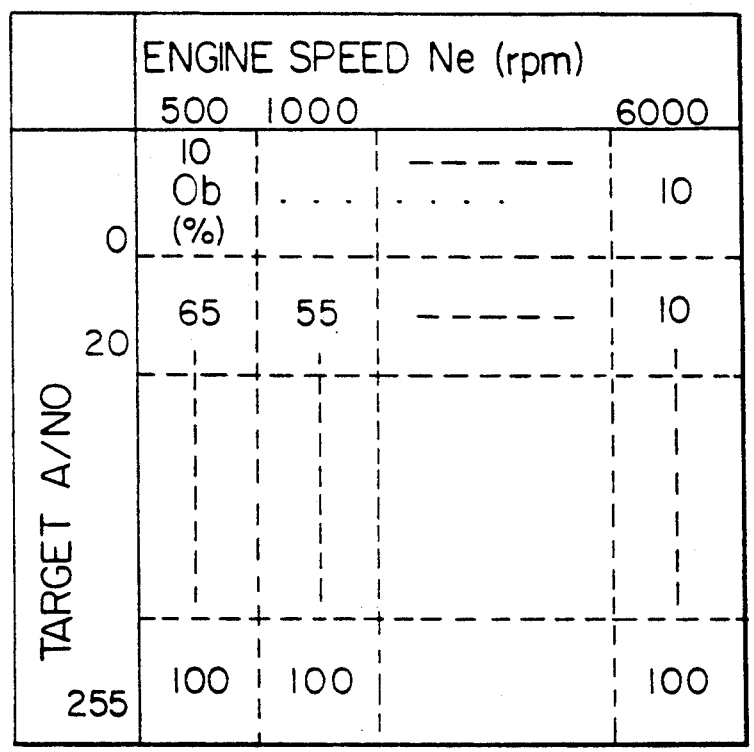
FIG. 46 is a map showing an equivalent throttle opening $\theta b$ with respect to a target air amount A/No and an engine speed Ne.

The target air amount A/NO calculated by the target air amount correction section 508 is supplied to an equivalent target throttle opening calculating section 516, and a three-dimensional map shown in FIG. 46 is referred to, thus obtaining an equivalent target throttle opening θb corresponding to the engine speed Ne and the target air amount A/NO. When one throttle valve is arranged, the equivalent target throttle opening θb is a throttle valve opening for attaining the target air amount A/NO. Furthermore, when the bypass paths 52b and 52c for bypassing the sub throttle valve THs are arranged, an opening Δθ1 corresponding to an air amount passing through the bypass paths 52b and 52c is subtracted from the equivalent target throttle opening θb. More specifically, a subtractor 517 subtracts the opening Δθ1 from the equivalent target throttle opening θb to obtain an equivalent target throttle opening θh. The equivalent target throttle opening θh is supplied to a target throttle opening calculating section 519. In the target throttle opening calculating section 519, the equivalent target throttle opening θh is multiplied with a correction coefficient K read from a map shown in FIG. 40, which stores the correction coefficient K determined from the relationship between the equivalent target throttle opening θh and the throttle opening θ1, thereby calculating the throttle opening θ2 of the sub throttle valve THs.

Furthermore, as in the first embodiment, the corrected target air amount A/NO outputted from the target air amount correction section 508 is supplied also to the subtractor 513 to calculate a difference ΔA/N between the target air amount A/NO and the actual air amount A/N detected by an air flow sensor every predetermined sampling time. The difference ΔP between the target air amount A/NO and the actual air amount A/N is supplied to the PID controller 514. The PID controller 514 calculates an opening correction value Δθ2 of the sub throttle valve THs corresponding to the difference ΔP. The sub throttle valve opening correction value Δθ2 is supplied to the adder 515.

The sub throttle valve opening correction value $\Delta\theta 2$ is obtained in the PID controller 514 by adding an opening correction value $\Delta\theta p$ by proportional control, an opening correction value $\Delta\theta i$ by integral control, and an opening correction value $\Delta\theta d$ by differential control, by the same calculation as in the first embodiment.

The adder 515 adds the target throttle opening $\theta 2$ corrected by the opening calculating section 519 and the sub throttle valve opening correction value $\Delta\theta 2$ calculated by the PID controller 514, thereby calculating a feedback-controlled target opening $\theta f$. The target opening $\theta f$ is supplied to the motor drive circuit 52 as a sub throttle valve opening signal $\theta s$. The motor drive circuit 52 controls the motor 52m so that the opening $\theta 2$ of the sub throttle valve THs detected by the sensor TPS2 is equal to an opening corresponding to the opening signal $\theta s$.

The engine output control operation of the second embodiment will be described below. Description of the same control steps as in the first embodiment will be omitted.

The target air amount A/NO calculated by the target air amount correction section 508 is supplied to the equivalent target throttle opening calculating section 516, and the map shown in FIG. 46 is referred to, thereby obtaining the equivalent target throttle opening $\theta b$ corresponding to the target air amount A/NO and the engine speed Ne. The subtractor 517 subtracts an opening $\Delta\theta 1$ calculated as will be described below by a $\theta b$ correction section 518 from the equivalent target throttle opening $\theta b$, thereby obtaining an equivalent throttle opening $\theta h$.

The above $\Delta\theta 1$ is obtained by the following equation, $$\Delta\theta 1 = Ks(\theta) * \{Sm + Sw(WT)\}$$

wherein a coefficient Ks (FIG. 44) is an opening correction value per step of a stepping motor 52s controlled by an idle speed controller (ISC) (not shown) having the target opening $\theta$ as a parameter, Sm is the number of steps of the stepping motor 52s, and Sw (FIG. 45) is a conversion factor for converting the opening of a wax valve 52W having the engine cooling water temperature WT as a parameter into the number of steps of the stepping motor 52s.

Figures 47, 48:
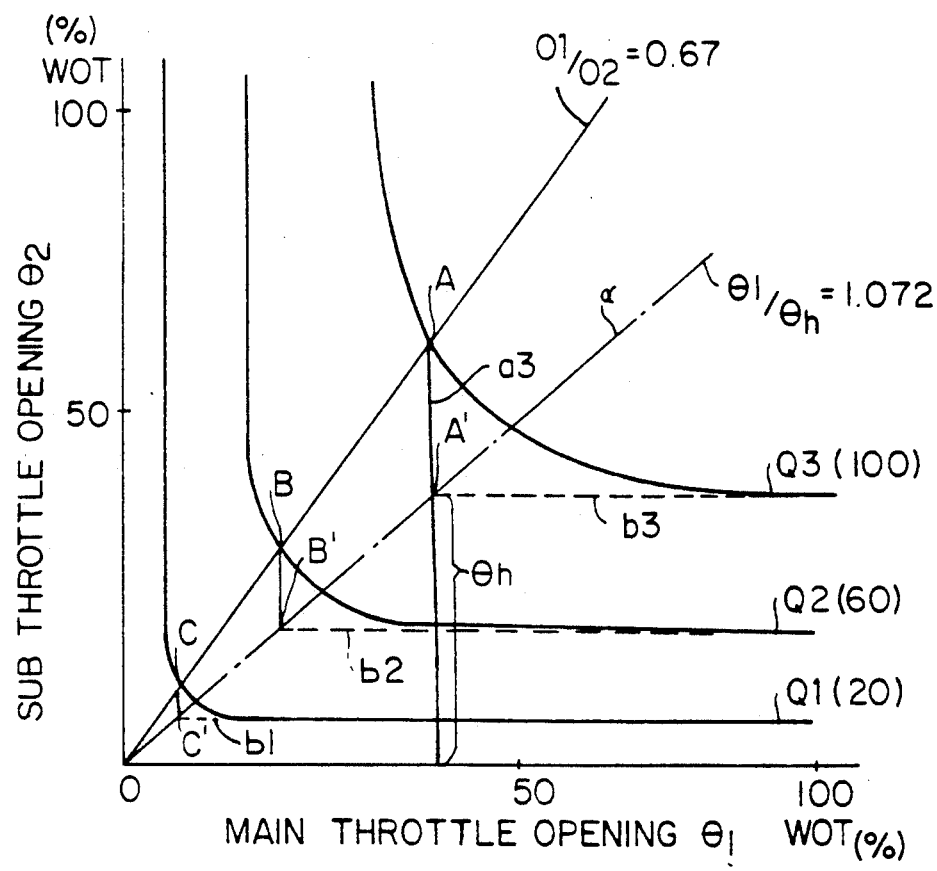
FIG. 47 is a map showing $\theta 1/\theta h$ versus a correction coefficient K.
FIG. 48 is an equivalent air amount curve showing relationship between a main throttle valve opening $\theta 1$ and a sub throttle valve opening $\theta 2$.

In the target throttle opening calculating section 519, the equivalent target throttle opening $\theta h$ is multiplied with a correction coefficient K shown in FIG. 47, thereby calculating the throttle opening $\theta 2$ of the sub throttle valve THs.

Calculation method for the target throttle opening $\theta 2$ of the sub throttle valve THs performed in the target throttle valve opening calculating section 519 will be described with reference to FIG. 48.

As shown in FIG. 1(B), when the main and sub throttle valves THm and THs are disposed in series in the air intake path, constant air amount characteristic curves Q1 to Q3 are nearly symmetrical about a straight line $\theta 1 = \theta 2$, and the individual curves are almost similar to each other about the point of origin as a focus. The constant air amount characteristic curves Q1 to Q3 show the relationship between the opening $\theta 1$ of the main throttle valve THm and the opening $\theta 2$ of the sub throttle valve THs when the individual air amounts are constant values of Q1 to Q3.

For example, an intersecting point of $\theta 1/\theta 2 = 0.67$ and the curve Q3 is assumed as A. In the characteristic curve Q3, when the opening $\theta 1$ of the main throttle valve THm is at the full-open position (WOT), the opening $\theta 2$ of the sub throttle valve THs (in this case, since the main throttle valve THm is full open, the opening $\theta 2$ is equal to the equivalent throttle opening when the main throttle valve THm and the sub throttle valve Ths are assumed as one throttle valve, and the equivalent throttle opening at this moment is referred to as $\theta h$) is 0.625 times the throttle opening $\theta 2$ at the point A. More specifically, the opening $\theta 2$ at an intersecting point A' of a straight line a3 extending downward from the point A with a constant throttle opening $\theta 1$ and a horizontal tangential line b3 of the characteristic curve Q3 is the target opening $\theta h$. This is because the tangential line b3 represents the opening $\theta 2$ of the sub throttle valve THs when the opening $\theta 1$ of the main throttle valve THm is WOT.

A straight line connecting the intersecting point A' and the point of origin is assumed as $\theta 1/\theta 2 = \alpha$ and hereinafter referred to as a straight line $\alpha$. When intersecting points of the characteristic curves Q1 and Q2 and a straight line $\theta 1/\theta 2 = 0.67$ are assumed as B and C, respectively, and projected points on the straight line $\alpha$ of the points B and C are assumed as B' and C', respectively, triangles OAA', OBB', and OCC' are similar to each other having the origin as a common vertex. Furthermore, since the characteristic curves Q1 to Q3 are similar to each other about the origin as a focus, if the horizontal tangential line b3 of the characteristic curve Q3 passes through the point A', horizontal tangential lines b1 and b2 of the characteristic curves individually pass through the points B' and C'.

Therefore, from the condition at the point B of the characteristic curve Q2, the opening $\theta 2$ of the sub throttle valve THs when the opening $\theta 1$ of the main throttle valve THm is WOT is at the position (point B') having 0.625 times the y coordinate of the point B, and from the condition at the point C of the characteristic curve Q3, the opening $\theta 2$ of the sub throttle valve THs when the opening $\theta 1$ of the main throttle valve THm is WOT is at the position (point C') having 0.625 times the y coordinate of the point C. As in the case of the point A', the points B' and C' also represent the equivalent throttle openings $\theta h$ of the individual characteristic curves.

Therefore, since $\theta 1/\&Hh = 1.072$ from $\theta 1/\theta 2 = 0.67$ and $\theta h = 0.625 * \theta 2$, the points A', B', and C' can be connected by a straight line $\theta 1/\theta h = 1.072$.

Thus, values of $\theta 1/\theta 2$ and those of $\theta 1/\theta h$ correspond one to one. Therefore, the value of $\theta 1/\theta h$ ($=\beta$) is previously obtained from FIG. 48 by changing the gradient of the straight line $\theta 1/\theta 2$ ($=\alpha$), $\theta 2 = \theta h*(\beta/\alpha)$ is calculated from $\theta 1 = \theta h*\beta$ and $\theta 1 = \theta*\alpha$. Thus, the opening $\theta 2$ of the sub throttle valve THs can be calculated by multiplying the target opening $\theta h$ with the correction coefficient K ($=\beta/\alpha$). As shown in FIG. 47, by calculating and mapping the correction coefficients K for $\theta 1/\theta h = \beta 1, \beta 2, \ldots$, the opening $\theta 2$ of the sub throttle valve THs corresponding to the target opening $\theta h$ can be calculated.

As in the first embodiment, the corrected target air amount A/NO outputted from the target air amount correction section 508 is supplied also to the subtractor 513 to calculate a difference $\Delta A/N$ between the target air amount A/NO and the present air amount A/N detected by an air flow sensor every predetermined sampling time. $\Delta A/N$ is supplied to the PID controller 514. The PID controller 514 performs PID control based on $\Delta A/N$ to calculate the opening correction value Δθ2 of the sub throttle valve THs corresponding to the difference ΔA/N. The sub throttle valve opening correction value Δθ2 is added in the adder 515 to the target throttle opening θ2, thereby calculating a feedback-controlled target opening θf. That is, the adder performs the following calculation:

$$\theta f = \theta 2 + \Delta \theta 2$$

The target opening θf obtained in this manner is supplied to the motor drive circuit 52 as a sub throttle valve opening signal θs. The motor 52m is controlled so that the opening θ2 of the sub throttle valve THs detected by the sensor TPS2 is equal to an opening corresponding to the opening signal θs, thereby controlling the engine output to the target engine torque T7.

In the above two embodiments, feedback control is performed by PID control based on ΔA/N by adding the sub throttle valve opening correction value Δθ2 to the target opening θ2, and the feedback-corrected target opening θf is outputted to the motor drive circuit 52. Alternatively, however, rather than the feedback control based on ΔA/N, the target opening θ2 may be outputted to the motor drive circuit 52, and the output of the throttle position sensor TPS2 may be feedback-controlled so that the opening of the sub throttle valve THs detected by the throttle position sensor TPS2 is equal to the target opening θ2. Furthermore, feedback control may be performed so that a detection value corrected by subtracting the sub throttle valve opening correction value Δθ2 from the opening of the sub throttle valve THs detected by the throttle position sensor TPS2 is equal to the target opening θ2.

The traction control apparatus are described above as embodiments of the present invention. However, the present invention is not limited to the above apparatus, but can also be applied to apparatus that control throttle valves.

Alternatively, by calculating the target engine torque T3 in the T/M friction correction section 502 using the [first procedure for T/M friction correction] and calculating the target engine torque T6 in the operation condition correction section 505 using the [second procedure for engine operation condition correction], the target engine torque can be corrected in accordance with a real-time oil temperature OT of T/M, and the target engine torque can also be corrected in accordance with a lapse time τ from the beginning of engine operation.

Furthermore, by calculating the target engine torque T3 in the T/M friction correction section 502 using the [second procedure for T/M friction correction] and calculating the target engine torque T6 in the engine operation condition correction section 505 using the [second procedure for engine operation condition correction], the target engine torque can be corrected in accordance with the warm-up condition of T/M based on an engine cooling water temperature WT, and the target engine torque can also be corrected in accordance with a lapse time τ from the beginning of engine operation.

Furthermore, by calculating the target engine torque T3 in the T/M friction correction section 502 using the [third procedure for T/M friction correction] and calculating the target engine torque T6 in the engine operation condition correction section 505 using the [second procedure for engine operation condition correction], the target engine torque can be corrected in accordance with the warm-up condition of T/M based on a cooling water temperture WTO immediately after the beginning of engine operation and a real-time cooling water temperature WT, and the target engine torque can also be corrected in accordance with a lapse time τ from the beginning of engine operation.

We claim:

1. A vehicle engine output control method comprising:
   calculating a target torque of an engine in accordance with an operational condition of a vehicle;
   calculating a target intake air amount per engine revolution cycle necessary to output said target engine torque;
   calculating an opening of a sub throttle valve disposed in an intake path of the engine from an opening of a main throttle valve disposed in the intake path of which said opening of said main throttle valve is controlled in accordance with an operation amount of an accelerator pedal and said target intake air amount;
   on/off controlling said sub throttle valve in accordance with said calculated sub throttle valve opening; and
   correcting said target engine torque in accordance with a response delay of a torque converter signal, a transmission friction signal, an external load signal of the engine, an atmospheric condition signal, and said operational condition of the vehicle, and, calculating said target intake air amount in accordance with said corrected target engine torque.

2. The vehicle engine output control method of claim 1 wherein a slip value of driving wheels of the vehicle is detected as said operation condition of the vehicle.

3. A vehicle engine output control method comprising:
   calculating a target torque of an engine in accordance with an operational condition of a vehicle;
   calculating a target intake air amount per engine revolution cycle necessary to output said target engine torque;
   calculating an equivalent throttle opening based on said target intake air amount assuming a main throttle valve disposed in an intake path of the engine of which said opening of said main throttle valve is controlled in accordance with an operation amount of an accelerator pedal and an independently on/off controllable sub throttle valve as an equivalent throttle valve;
   correcting said equivalent throttle opening with a correction coefficient determined by a relationship between said equivalent throttle opening and said main throttle valve opening to calculate an opening of said sub throttle valve;
   on/off controlling said sub throttle valve in accordance with said calculated sub throttle valve opening; and
   correcting said target engine torque in accordance with a response delay of a torque converter signal, a transmission friction signal, an external load signal of the engine, an atmospheric condition signal, and said operation condition of the vehicle, and, calculating said target intake air amount in accordance with said corrected target engine torque.

4. The vehicle engine output control method of claim 3 wherein a slip value of driving wheels of the vehicle is detected as said operation condition of the vehicle.

5. A vehicle engine output control apparatus comprising:
- a main throttle valve disposed in an intake path of an engine for a vehicle, of which an opening is controlled in accordance with an operation amount of an accelerator pedal;
- a sub throttle valve disposed in the intake path,
- operation condition detecting means for detecting operation condition of the vehicle;
- target engine torque calculating means for calculating an engine torque to be outputted from the engine in accordance with the detection result of said operation condition detecting means;
- target intake air amount calculating means for calculating a target intake air amount per engine revolution cycle required to generate said target engine torque;
- sub throttle valve opening calculating means for calculating an opening of the sub throttle valve from said target intake air amount and an opening of said main throttle valve; and,
- sub throttle valve on/off control means for on/of controlling said sub throttle valve in accordance with said calculated sub throttle valve opening; and
- wherein said target engine torque calculating means comprises a correction section for correcting said target engine torque in accordance with a response delay of a torque converter, a transmission friction, an external load of the engine, an atmospheric condition, and an operation condition.

6. The vehicle engine output control apparatus of claim 5 wherein said operation condition detecting means comprises driving wheel velocity detecting means for detecting a driving wheel velocity of the vehicle and driven wheel velocity detecting means for detecting a driven wheel velocity of the vehicle and calculates a slip value in accordance with a difference between said driving wheel velocity of the vehicle detected by said driving wheel velocity detecting means and said driven wheel velocity of the vehicle detected by said driven wheel velocity detecting means.

7. A vehicle engine output control apparatus comprising:
- a main throttle valve disposed in an intake path of an engine for a vehicle, of which an opening is controlled in accordance with an operation amount of an accelerator pedal;
- a sub throttle valve disposed in the intake path,
- operation condition detecting means for detecting operation condition of the vehicle;
- target engine torque calculating means for calculating an engine torque to be outputted from the engine in accordance with the detection result of said operation condition detecting means;
- target intake air amount calculating means for calculating a target intake air amount per engine revolution cycle required to generate said target engine torque;
- equivalent throttle valve opening calculating means for calculating an equivalent throttle opening from said target intake air amount per engine revolution cycle assuming said main and sub throttle valves as an equivalent throttle valve;
- correction coefficient storing means for storing a correction coefficient determined by the relationship between said equivalent throttle opening and said main throttle valve opening;
- sub throttle valve opening calculating means for calculating a sub throttle valve opening by correcting said equivalent throttle opening with said correction coefficient; and
- sub throttle valve on/off control means for on/off controlling said sub throttle valve in accordance with said calculated sub throttle valve opening;
- wherein said target engine torque calculating means comprises a correction section for correcting said target engine torque in accordance with a response delay of a torque converter, a transmission friction, an external load of the engine, an atmospheric condition and an operation condition.

8. The vehicle engine output control apparatus of claim 7 wherein said operation condition detecting means comprises driving wheel velocity detecting means for detecting a driving wheel velocity of the vehicle and driven wheel velocity detecting means for detecting a driven wheel velocity of the vehicle and calculates a slip value in accordance with a difference between said driving wheel velocity of the vehicle detected by said driving wheel velocity detecting means and said driven wheel velocity of the vehicle detected by said driven wheel velocity detecting means.

* * * * *